US011496816B2

(12) United States Patent
Troutman et al.

(10) Patent No.: US 11,496,816 B2
(45) Date of Patent: Nov. 8, 2022

(54) TELEMATICS ROAD READY SYSTEM INCLUDING A BRIDGE INTEGRATOR UNIT

(71) Applicant: Truck-Lite Co., LLC, Falconer, NY (US)

(72) Inventors: Scott Troutman, Falconer, NY (US); Roger Elmer, Russell, PA (US); Andrew King, Pittsburgh, PA (US)

(73) Assignee: Truck-Lite Co., LLC, Falconer, NY (US)

(*) Notice: Subject to any disclaimer, the term of this patent is extended or adjusted under 35 U.S.C. 154(b) by 0 days.

(21) Appl. No.: 17/107,012

(22) Filed: Nov. 30, 2020

(65) Prior Publication Data

US 2021/0112318 A1 Apr. 15, 2021

Related U.S. Application Data

(63) Continuation of application No. 16/293,578, filed on Mar. 5, 2019, now abandoned, and a
(Continued)

(51) Int. Cl.
H04Q 9/00 (2006.01)
H04W 84/04 (2009.01)
(Continued)

(52) U.S. Cl.
CPC .............. H04Q 9/00 (2013.01); B60D 1/248 (2013.01); B60R 16/023 (2013.01); B60Y 2200/148 (2013.01); B62D 53/06 (2013.01); B62D 63/08 (2013.01); H04L 2012/40215 (2013.01); H04L 2012/40273 (2013.01); H04Q 2209/40 (2013.01); H04Q 2209/43 (2013.01);
(Continued)

(58) Field of Classification Search
CPC . B60D 1/248; B60D 1/36; H04Q 9/00; G07C 5/0825; B60C 23/0462
See application file for complete search history.

(56) References Cited

U.S. PATENT DOCUMENTS 4,745,339 A 5/1988 Izawa et al.
5,142,278 A 8/1992 Moallemi et al.
(Continued)

FOREIGN PATENT DOCUMENTS

EP 1744602 A2 1/2007
EP 1830607 A1 9/2007
(Continued)

Primary Examiner — Hoi C Lau

(57) ABSTRACT

A trailer monitoring system for monitoring a trailer having at least one trailer sensor has a bridge integrator unit, configured to couple with the trailer, including a wireless data transceiver electrically coupled with a microcontroller and capable of wirelessly communicating data over a short-range wireless protocol; the bridge integrator unit receives data existing in a first messaging format that is compatible with and used by one or more trailer sensors via a short-range wireless protocol, extracts the data, encodes the data into a second messaging format that is compatible with a master control unit having a telematic data transceiver capable of cellular data communications, and transmits the data in the second messaging format from the bridge integrator unit to the master control unit via a short-range wireless protocol.

20 Claims, 22 Drawing Sheets

Related U.S. Application Data continuation-in-part of application No. 15/904,422, filed on Feb. 25, 2018, now Pat. No. 10,388,161, and a continuation-in-part of application No. 15/460,166, filed on Mar. 15, 2017, now Pat. No. 10,093,232.

(51) Int. Cl.
*H04L 12/40* (2006.01)
*B60D 1/24* (2006.01)
*B60R 16/023* (2006.01)
*B62D 53/06* (2006.01)
*B62D 63/08* (2006.01)

(52) U.S. Cl.
CPC ... *H04Q 2209/75* (2013.01); *H04Q 2209/886* (2013.01); *H04W 84/042* (2013.01)

(56) References Cited

U.S. PATENT DOCUMENTS

| | | | |
|---|---|---|---|
| 5,157,376 A | 10/1992 | Dietz et al. | |
| 6,084,870 A | 7/2000 | Wooten et al. | |
| 6,127,939 A | 10/2000 | Lesesky et al. | |
| 6,130,487 A | 10/2000 | Bertalan et al. | |
| 6,175,301 B1* | 1/2001 | Piesinger | B60C 23/0433 340/442 |
| 6,198,390 B1 | 3/2001 | Schlager et al. | |
| 6,218,952 B1 | 4/2001 | Borland et al. | |
| 6,278,936 B1 | 8/2001 | Jones | |
| 6,292,724 B1 | 9/2001 | Apsell et al. | |
| 6,295,449 B1 | 9/2001 | Westerlage et al. | |
| 6,317,029 B1 | 11/2001 | Fleeter | |
| 6,346,876 B1 | 2/2002 | Flick | |
| 6,392,364 B1 | 5/2002 | Yamamoto et al. | |
| 6,442,485 B2 | 8/2002 | Evans | |
| 6,484,035 B2 | 11/2002 | Allen, Jr. | |
| 6,490,512 B1 | 12/2002 | Niggemann | |
| 6,611,686 B1 | 8/2003 | Smith et al. | |
| 6,651,001 B2 | 11/2003 | Apsell | |
| 6,674,288 B2 | 1/2004 | Gumbel et al. | |
| 6,687,609 B2 | 2/2004 | Hsiao et al. | |
| 6,735,150 B2 | 5/2004 | Rothman | |
| 6,744,352 B2 | 6/2004 | Lesesky et al. | |
| 6,788,195 B1 | 9/2004 | Stegman et al. | |
| 6,804,602 B2 | 10/2004 | Impson et al. | |
| 6,832,153 B2 | 12/2004 | Thayer et al. | |
| 6,850,839 B1 | 2/2005 | McGibney | |
| 6,858,986 B2 | 2/2005 | Monk | |
| 6,907,253 B2 | 6/2005 | Parisi | |
| 7,040,435 B1 | 5/2006 | Lesesky et al. | |
| 7,042,165 B2 | 5/2006 | Madhani et al. | |
| 7,046,132 B2 | 5/2006 | Carpenter | |
| 7,064,658 B2 | 6/2006 | Burlak et al. | |
| 7,072,668 B2 | 7/2006 | Chou | |
| 7,098,784 B2 | 8/2006 | Easley et al. | |
| 7,126,464 B2 | 10/2006 | Harvey | |
| 7,196,621 B2* | 3/2007 | Kochis | G08B 13/24 340/948 |
| 7,250,872 B2 | 7/2007 | Klinger | |
| 7,257,472 B2 | 8/2007 | Hauer et al. | |
| 7,339,460 B2 | 3/2008 | Lane et al. | |
| 7,339,465 B1 | 3/2008 | Cheng et al. | |
| 7,394,363 B1 | 7/2008 | Ghahramani | |
| 7,415,325 B2 | 8/2008 | Knosmann et al. | |
| 7,429,917 B2 | 9/2008 | Fredericks et al. | |
| 7,430,464 B2 | 9/2008 | Bell et al. | |
| 7,430,471 B2 | 9/2008 | Simon | |
| 7,460,871 B2 | 12/2008 | Humphries et al. | |
| 7,498,925 B2 | 3/2009 | Battista | |
| 7,528,553 B2 | 5/2009 | Ito et al. | |
| 7,535,375 B2 | 5/2009 | McDermott, Sr. | |
| 7,545,266 B2 | 6/2009 | Brosius | |
| 7,554,441 B2 | 6/2009 | Viegers et al. | |
| 7,589,471 B2 | 9/2009 | Kaczorowski | |
| 7,649,455 B2 | 1/2010 | Easley et al. | |
| 7,702,358 B2 | 4/2010 | Meyers | |
| 7,714,719 B2 | 5/2010 | Duff | |
| 7,784,707 B2 | 8/2010 | Witty et al. | |
| 7,813,870 B2* | 10/2010 | Downs | G08G 1/0104 340/995.13 |
| 7,843,335 B2 | 11/2010 | Furey et al. | |
| 7,876,103 B2 | 1/2011 | Mihai et al. | |
| 7,904,260 B2 | 3/2011 | Burlak et al. | |
| 7,932,815 B2 | 4/2011 | Martinez et al. | |
| 7,965,181 B2 | 6/2011 | Rana et al. | |
| 7,978,065 B2 | 7/2011 | Schnitz et al. | |
| 7,991,357 B2 | 8/2011 | Meyers et al. | |
| 8,000,843 B2 | 8/2011 | Kim | |
| 8,010,127 B2 | 8/2011 | Burtner et al. | |
| 8,032,278 B2 | 10/2011 | Flick | |
| 8,065,073 B2* | 11/2011 | Downs | G08G 1/0104 340/995.13 |
| 8,223,009 B2 | 7/2012 | Anderson et al. | |
| 8,275,540 B2* | 9/2012 | Downs | G08G 1/0104 340/995.13 |
| 8,307,667 B2 | 11/2012 | Rusignuolo et al. | |
| 8,334,662 B2 | 12/2012 | Jin et al. | |
| 8,362,886 B2 | 1/2013 | Flick | |
| 8,362,888 B2 | 1/2013 | Roberts, Sr. et al. | |
| 8,374,824 B2 | 2/2013 | Schwiers et al. | |
| 8,378,843 B2 | 2/2013 | Mackenzie et al. | |
| 8,390,464 B1 | 3/2013 | Slifkin et al. | |
| 8,416,067 B2 | 4/2013 | Davidson et al. | |
| 8,461,958 B2 | 6/2013 | Saenz et al. | |
| 8,461,973 B2* | 6/2013 | Reed | B60K 28/066 455/418 |
| 8,471,498 B2 | 6/2013 | Aboulnaga | |
| 8,503,145 B2 | 8/2013 | Hulett | |
| 8,559,937 B2 | 10/2013 | Ram et al. | |
| 8,575,839 B2 | 11/2013 | Inoue et al. | |
| 8,577,358 B2 | 11/2013 | Wesby | |
| 8,599,260 B1 | 12/2013 | Vaughn | |
| 8,620,623 B2 | 12/2013 | Meyers et al. | |
| 8,633,813 B2 | 1/2014 | Shank et al. | |
| 8,635,035 B2 | 1/2014 | De Oto et al. | |
| 8,653,539 B2 | 2/2014 | Tischler et al. | |
| 8,660,745 B2 | 2/2014 | Risse et al. | |
| 8,665,083 B2 | 3/2014 | Easley et al. | |
| 8,680,976 B2* | 3/2014 | Lesesky | B60R 16/0315 340/431 |
| 8,700,255 B2* | 4/2014 | Joseph | G09B 19/16 342/147 |
| 8,717,163 B2 | 5/2014 | Easley et al. | |
| 8,749,142 B2 | 6/2014 | Nguyen et al. | |
| 8,751,098 B2 | 6/2014 | Faus et al. | |
| 8,760,274 B2 | 6/2014 | Boling et al. | |
| 8,816,697 B2 | 8/2014 | Miller et al. | |
| 8,853,965 B2 | 10/2014 | Bouws et al. | |
| 8,855,626 B2 | 10/2014 | O'Toole et al. | |
| 8,890,683 B2 | 11/2014 | Schnitz et al. | |
| 8,896,430 B2 | 11/2014 | Davidson et al. | |
| 8,902,590 B2 | 12/2014 | Tom et al. | |
| 8,947,096 B1 | 2/2015 | Wolf | |
| 8,964,431 B2 | 2/2015 | Sato et al. | |
| 8,981,647 B2 | 3/2015 | Ding et al. | |
| 9,002,538 B2 | 4/2015 | Hergesheimer et al. | |
| 9,043,078 B2 | 5/2015 | Johnson et al. | |
| 9,073,446 B2 | 7/2015 | Hani et al. | |
| 9,082,103 B2 | 7/2015 | Breed | |
| 9,103,521 B2 | 8/2015 | Nishitani et al. | |
| 9,119,270 B2 | 8/2015 | Chen et al. | |
| 9,127,945 B2 | 9/2015 | Telang et al. | |
| 9,144,026 B2 | 9/2015 | Sanders et al. | |
| 9,147,335 B2 | 9/2015 | Raghunathan et al. | |
| 9,161,414 B2 | 10/2015 | Brancken et al. | |
| 9,171,460 B2 | 10/2015 | Chen et al. | |
| 9,189,661 B1 | 11/2015 | Meyers | |
| 9,237,627 B2 | 1/2016 | Takata et al. | |
| 9,251,694 B2 | 2/2016 | Kleve et al. | |
| 9,370,082 B2 | 6/2016 | Yoneoka et al. | |
| 9,374,873 B2 | 6/2016 | Wolfe | |
| 9,406,222 B2 | 8/2016 | Hergesheimer et al. | |
| 9,415,759 B2 | 8/2016 | Greene et al. | |
| 9,428,127 B2 | 8/2016 | Cooper et al. | |

(56) References Cited

U.S. PATENT DOCUMENTS

| | | |
|---|---|---|
| 9,434,308 B2 | 9/2016 | Bean |
| 9,472,030 B2 | 10/2016 | Davidson et al. |
| 9,489,778 B2 | 11/2016 | Hering |
| 9,499,109 B2* | 11/2016 | Armacost .............. H04L 12/40 |
| 9,500,691 B2 | 11/2016 | Yun |
| 9,628,565 B2 | 4/2017 | Stenneth et al. |
| 9,668,317 B2 | 5/2017 | LeSaffre |
| 9,691,194 B2 | 6/2017 | Davidson |
| 9,704,303 B2 | 7/2017 | Davidson et al. |
| 9,717,066 B2 | 7/2017 | Battista |
| 9,803,683 B2 | 10/2017 | Simonneau et al. |
| 10,065,563 B2 | 9/2018 | Cornelius et al. |
| 10,093,232 B2* | 10/2018 | Troutman ............. B60R 16/023 |
| 10,271,411 B2 | 4/2019 | Troutman |
| 10,388,161 B2* | 8/2019 | Troutman ............. G07C 5/0825 |
| 2003/0080856 A1 | 5/2003 | Sparacino et al. |
| 2003/0204407 A1 | 10/2003 | Nabors et al. |
| 2004/0233041 A1 | 11/2004 | Bohman et al. |
| 2005/0187675 A1 | 8/2005 | Schofield et al. |
| 2005/0273277 A1* | 12/2005 | Ridnour ............... G01M 17/007 702/42 |
| 2006/0139942 A1 | 6/2006 | Pond et al. |
| 2006/0187026 A1* | 8/2006 | Kochis ............... G08B 21/0269 340/539.13 |
| 2006/0238332 A1* | 10/2006 | Carle ................... G08C 17/00 340/539.1 |
| 2007/0052527 A1* | 3/2007 | Song ................. B60C 23/0483 340/445 |
| 2007/0063832 A1* | 3/2007 | Ollis ..................... G08B 25/14 340/510 |
| 2007/0108843 A1 | 5/2007 | Preston et al. |
| 2007/0200765 A1 | 8/2007 | Meyers et al. |
| 2007/0208492 A1* | 9/2007 | Downs ................. G08G 1/0104 701/117 |
| 2007/0239346 A1 | 10/2007 | Hawkins et al. |
| 2008/0229289 A1* | 9/2008 | Nauman ................. H03M 7/30 717/136 |
| 2008/0231198 A1 | 9/2008 | Zarr |
| 2008/0316012 A1 | 12/2008 | Paasche et al. |
| 2009/0160646 A1 | 6/2009 | Mackenzie et al. |
| 2009/0219148 A1 | 9/2009 | Thomas et al. |
| 2009/0243895 A1* | 10/2009 | Mitchell ................. H01Q 1/007 340/971 |
| 2010/0066501 A1 | 3/2010 | Ulrich et al. |
| 2010/0087984 A1* | 4/2010 | Joseph .................. G09B 19/16 701/31.4 |
| 2011/0080274 A1* | 4/2011 | Reed ................... B60K 28/066 340/425.5 |
| 2011/0082636 A1* | 4/2011 | Barker .................. G08G 1/0104 701/117 |
| 2011/0169424 A1 | 7/2011 | Aboulnaga |
| 2011/0169447 A1 | 7/2011 | Brown et al. |
| 2011/0193484 A1 | 8/2011 | Harbers et al. |
| 2011/0281522 A1 | 11/2011 | Suda |
| 2012/0028580 A1* | 2/2012 | Oesterling ......... G07C 9/00174 455/41.2 |
| 2012/0098430 A1 | 4/2012 | Inoue et al. |
| 2012/0136561 A1* | 5/2012 | Barker ................. G08G 1/0104 701/117 |
| 2012/0161633 A1 | 6/2012 | Nishitani et al. |
| 2012/0187847 A1 | 7/2012 | Hamamoto et al. |
| 2012/0218790 A1 | 8/2012 | Sato et al. |
| 2013/0147617 A1 | 6/2013 | Boling et al. |
| 2013/0250845 A1* | 9/2013 | Greene .................. G08C 17/02 370/315 |
| 2013/0257145 A1* | 10/2013 | Caldeira ................ B60L 53/00 307/9.1 |
| 2014/0097761 A1 | 4/2014 | Chen et al. |
| 2014/0139143 A1 | 5/2014 | Navabi-Shirazi et al. |
| 2014/0347194 A1 | 11/2014 | Schnitz et al. |
| 2015/0015143 A1 | 1/2015 | Inada |
| 2015/0102726 A1 | 4/2015 | Yoneoka et al. |
| 2015/0108901 A1* | 4/2015 | Greene ................ H05B 47/115 315/149 |
| 2015/0137679 A1 | 5/2015 | Gary |
| 2015/0262485 A1* | 9/2015 | Rennie .................. H04W 24/08 340/905 |
| 2015/0269366 A1 | 9/2015 | Bells |
| 2015/0306928 A1* | 10/2015 | McCollum ............ B60W 50/14 340/431 |
| 2015/0318772 A1 | 11/2015 | Jahshan |
| 2015/0349977 A1 | 12/2015 | Risse et al. |
| 2016/0019497 A1* | 1/2016 | Carvajal ............... H04W 4/029 701/519 |
| 2016/0027224 A1 | 1/2016 | Bankowski et al. |
| 2016/0052453 A1 | 3/2016 | Orion et al. |
| 2016/0086391 A1 | 3/2016 | Ricci |
| 2016/0121792 A1 | 5/2016 | Christopherson et al. |
| 2016/0125816 A1 | 5/2016 | Chong et al. |
| 2016/0128168 A1 | 5/2016 | Walker et al. |
| 2016/0197740 A1 | 7/2016 | Risse et al. |
| 2016/0303925 A1* | 10/2016 | Liu ..................... B60C 23/0479 |
| 2016/0311273 A1 | 10/2016 | Zaroor et al. |
| 2016/0352533 A1* | 12/2016 | Talty ..................... H04W 4/48 |
| 2017/0006671 A1 | 1/2017 | LeSaffre |
| 2017/0012193 A1* | 1/2017 | Jogia ...................... H02J 7/025 |
| 2017/0027043 A1* | 1/2017 | Greene ................... H05B 47/19 |
| 2017/0061171 A1 | 3/2017 | Lombardi et al. |
| 2017/0072854 A1 | 3/2017 | Cornelius et al. |
| 2017/0107090 A1* | 4/2017 | Mondal ................. B66F 11/044 |
| 2017/0132912 A1* | 5/2017 | Liao ....................... G08C 23/04 |
| 2017/0171952 A1 | 6/2017 | Troutman |
| 2017/0193443 A1 | 7/2017 | Barcala et al. |
| 2017/0195854 A1 | 7/2017 | Shi-Nash et al. |
| 2017/0195958 A1 | 7/2017 | Korneluk et al. |
| 2018/0009377 A1* | 1/2018 | Troutman ............. B60Q 11/005 |
| 2018/0029389 A1 | 2/2018 | Ando |
| 2018/0062873 A1* | 3/2018 | Chiang ................... H04W 4/18 |
| 2018/0077763 A1* | 3/2018 | Schneider ................ A61J 9/02 |
| 2018/0099712 A1 | 4/2018 | Bean et al. |
| 2018/0103411 A1* | 4/2018 | Greene ................... H05B 47/11 |
| 2018/0229786 A1 | 8/2018 | Weaver et al. |
| 2018/0279429 A1 | 9/2018 | Sadwick |
| 2018/0293891 A1* | 10/2018 | Troutman ............. G07C 5/0825 |
| 2019/0004144 A1* | 1/2019 | O'Shea ................... G01S 5/02 |
| 2019/0268675 A1* | 8/2019 | Troutman ............... H04Q 9/00 |
| 2020/0129006 A1 | 4/2020 | Nivala ................. G08B 21/182 |
| 2020/0160628 A1 | 5/2020 | Tseng et al. |
| 2021/0112318 A1* | 4/2021 | Troutman ............... H04Q 9/00 |
| 2021/0235248 A1* | 7/2021 | Juntunen ............. H04L 12/2832 |
| 2021/0318890 A1* | 10/2021 | Chang ................... G06F 3/0625 |

FOREIGN PATENT DOCUMENTS

| | | |
|---|---|---|
| GB | 2511095 A | 8/2014 |
| WO | WO2008135622 A1 | 11/2008 |
| WO | WO2012077013 A3 | 8/2012 |

\* cited by examiner

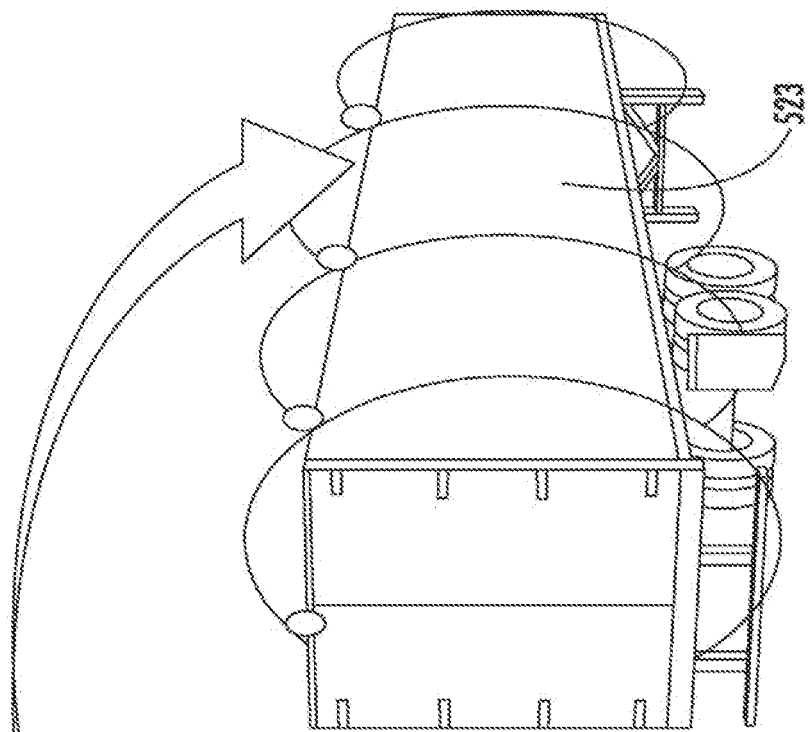
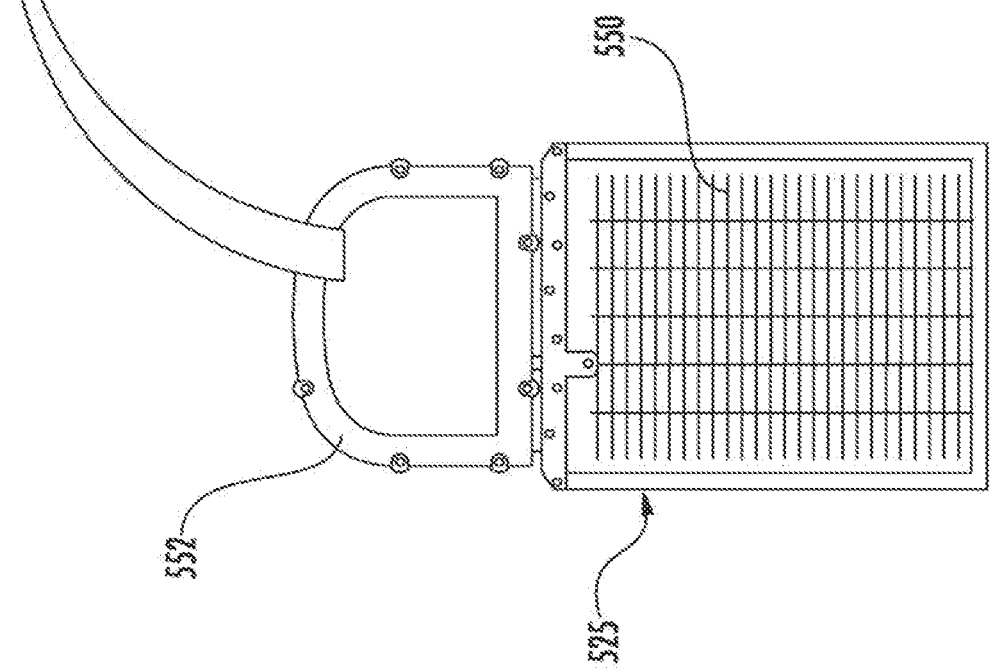
FIG. 2

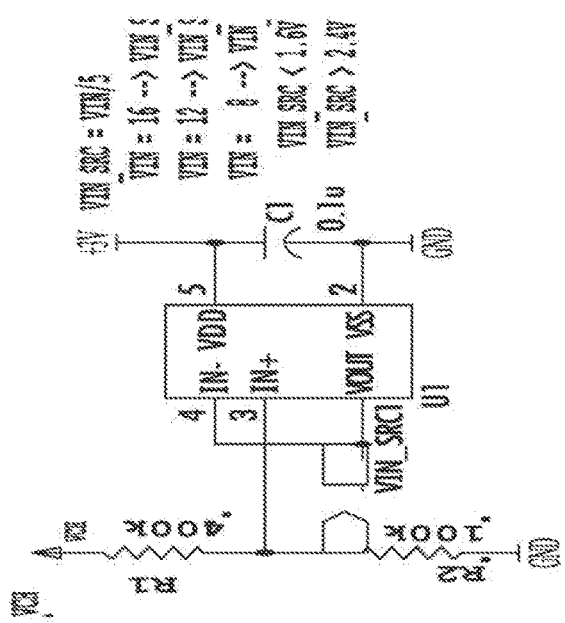
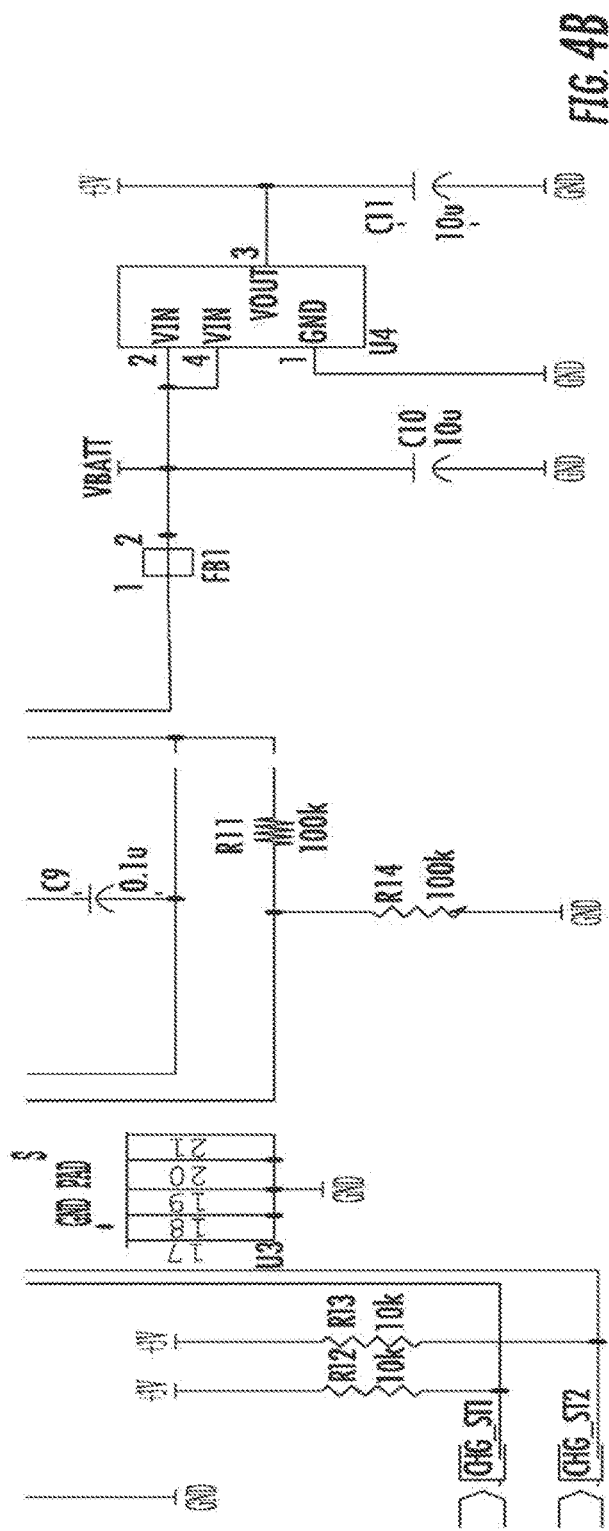
FIG. 4B

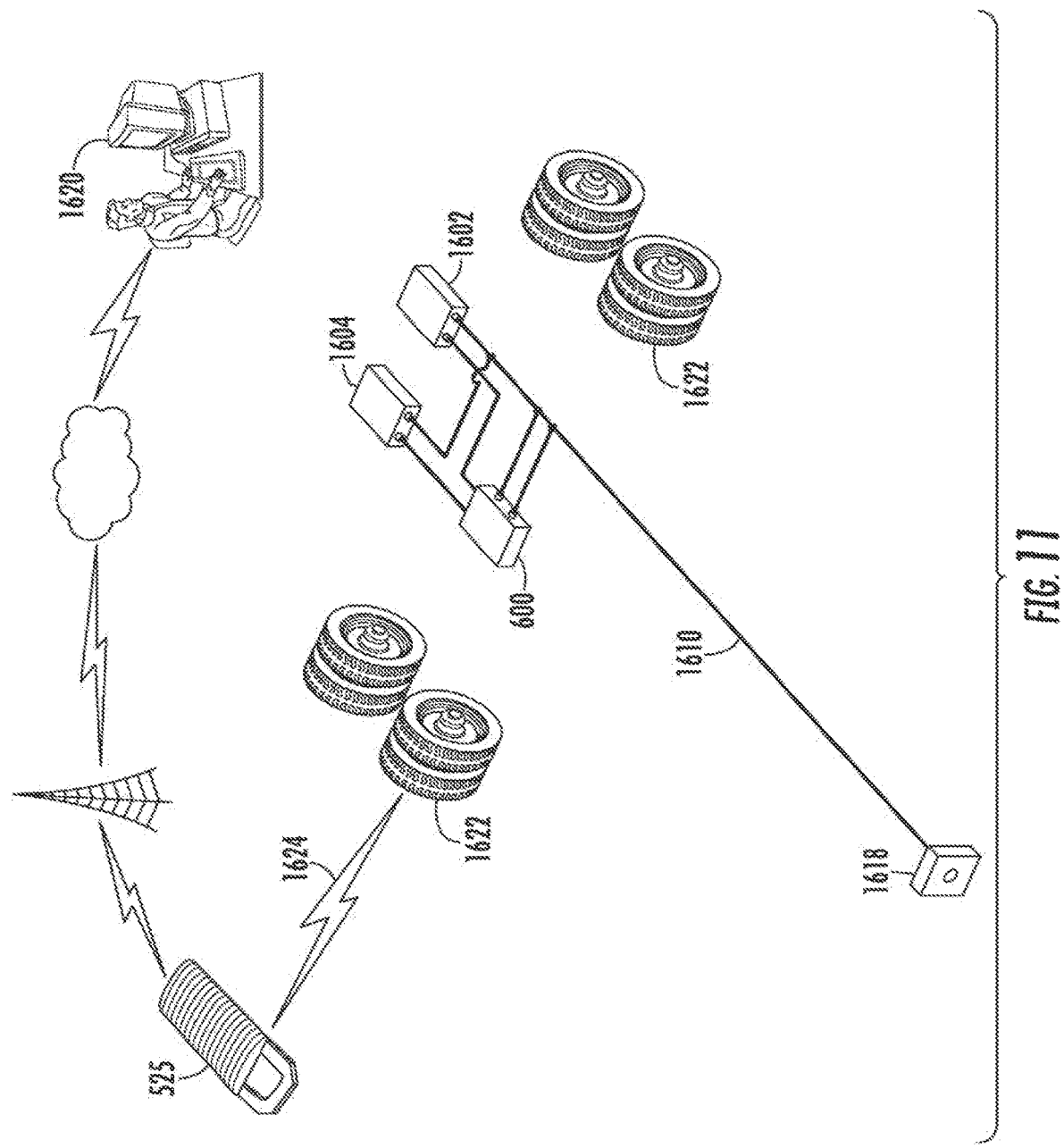

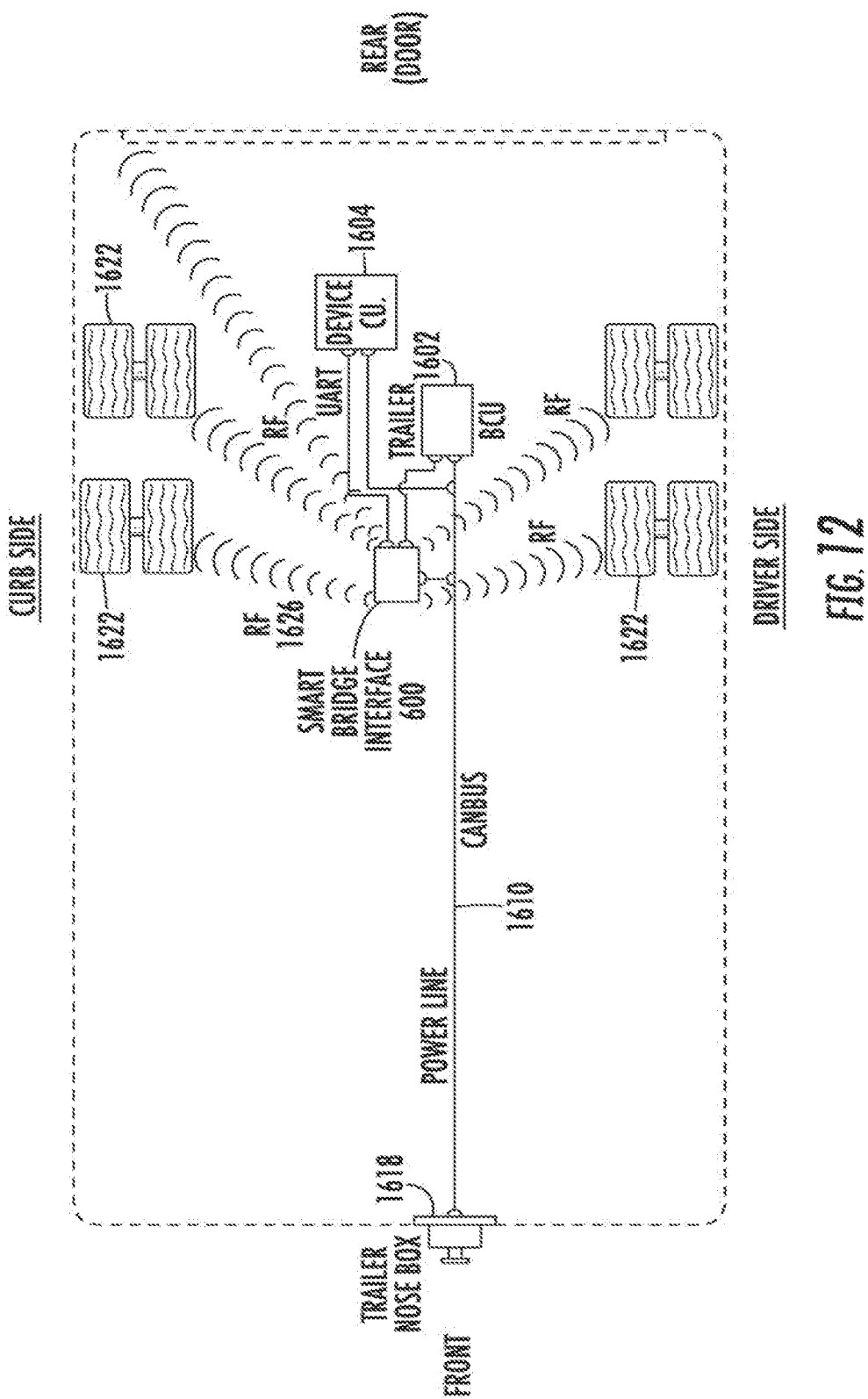

FIG. 15

TELEMATICS ROAD READY SYSTEM INCLUDING A BRIDGE INTEGRATOR UNIT

FIELD OF THE INVENTION

The present application is directed to a telematics system including a bridge integrator unit for receiving and translating data transmissions from more than one type of data transmissions from sensory devices and transmitting the translated messages to a master control unit.

BRIEF SUMMARY

Embodiments disclosed herein disclose a bridge integrator unit with ability to receive data transmissions from more than one type of data transmission from a sensory device or plurality of sensors or sensory devices. As referred to herein, the bridge integrator unit is a hub for various forms of data coming from sensory devices manufactured across the industry of transportation. The bridge integrator unit can communicate at least via radio frequency, an RS232 UART connection, and by a CAN bus connection to a CAN bus data system that is an industry standard North American data bus for trailers. Different embodiments of the bridge integrator unit encompass the different transmissions modes, among others configured as desired, that can come into the bridge integrator unit from different manufactures of sensory devices. Thus, the data can be translated to a master control unit (MCU). In particular, the data coming into the bridge integrator unit will work from messaging data, i.e. in a comma delimited format, that will be translated from the sensory devices protocol to a proprietary firmware language and then broadcast to the MCU using a radio frequency band of IEEE 802.15.4.

The different means of communication from several devices can come in to the bridge integrator unit simultaneously. From this data that is transmitted into the bridge integrator unit, messages that are sent to the MCU are configured to be transmitted if and when a condition arises to notify a user of the equipment (e.g., a trailer). The bridge integrator unit may be powered from a trailer blue line power on the trailer when connected to a tractor, and may also resource its battery backup if not connected to the blue line power. For that reason, the bridge integrator unit can work independently from the tractor power, untethered from the tractor, and still broadcast data being received from the sensory devices. As such, the bridge integrator unit can be queried as to status and real-time data updates whether tethered with a tractor, or untethered, such as in a parking lot. This feature provides the end user the ability to access the trailer network (telematically) through the MCU and request status updates from the sensory devices remotely or with assistance from onsite human interaction.

BRIEF DESCRIPTION OF THE DRAWINGS

FIG. 2 illustrates a master control unit and a wireless network around a trailer.

FIGS. 4A-4D illustrate example circuit diagrams for use in a bridge integrator unit.

FIGS. 10-12 illustrate a bridge integrator unit interconnected with various components of a system for communication in a trailer network.

Figure 15:
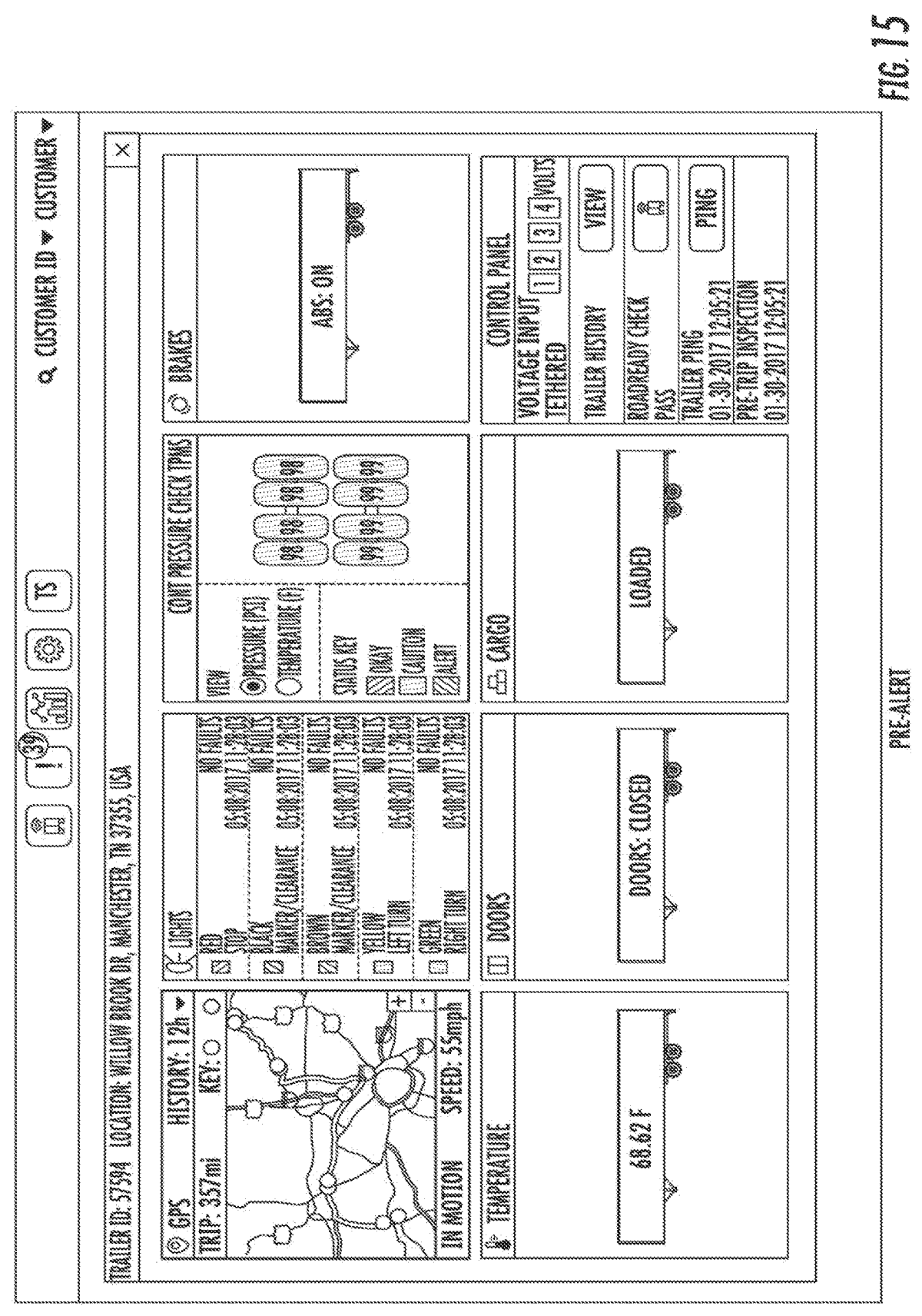

FIGS. 14-16 illustrate examples of user interface screen shots of the telematics system with a widget displayed as to communication from a bridge integrator unit.

DETAILED DESCRIPTION OF EMBODIMENTS OF THE INVENTION

Figure 1:
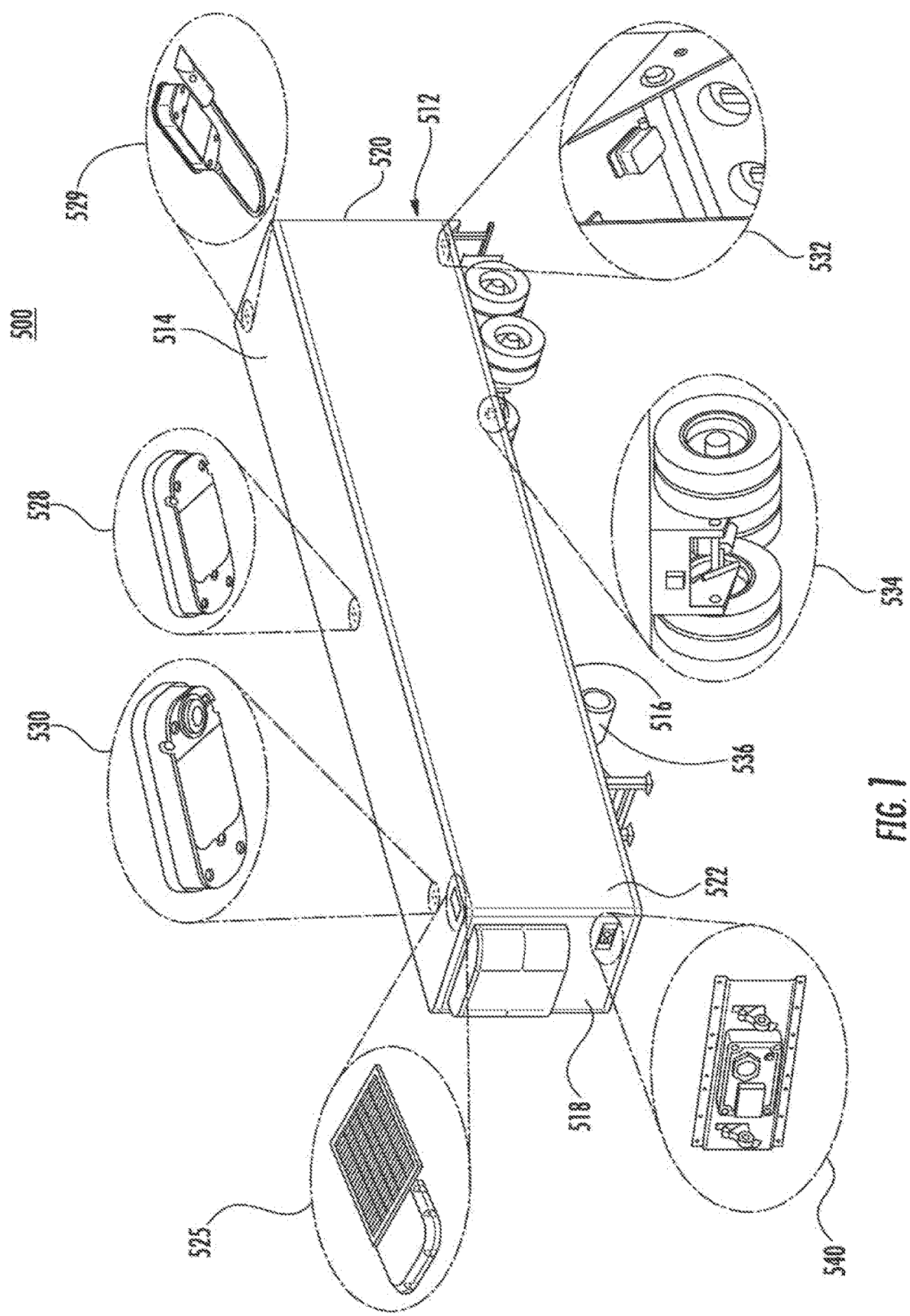
FIG. 1 illustrates a telematics system including multiple sensing devices.

As shown in FIG. 1, a telematics system 500 (such as Road Ready™) sends, receives and stores data acquired from sensors attached to various systems and components of a trailer 512 and communicates the data to external display devices through radio frequency power line carrier or light communication, such as fiber optics. Sensors are configured to communicate with a master control unit (MCU) 525 of the telematics system, or other such external device.

The telematics system 500 sends, receives and stores data acquired from a light failure detection system, as indicated at 540. Light failure detection system 540 is capable of multi-volt operation, such as 12V/24V, 10-30V, and 10-42V. Further, light failure detection system 540 includes LED and Incandescent Lamp capabilities (capable of determining current between LED/Incandescent), monitoring of anti-lock brake system (ABS) (On/Off), battery power for untethered operation to facilitate: asset location determination and/or asset remote diagnostic check. The light failure detection system 540 may be used in conjunction with multiple trailer configurations, including trailers of various sizes, dimensions, flat-beds, enclosed trailers, specifically pup trailers as defined by standards in transportation, or otherwise; and additional sensors including wireless (radio frequency (RF) or optical) or hardwired sensors may be included as well.

A nose box assembly 541 of the trailer communication system includes components of the light failure detection system 540 includes a wireless transmitting device with a communication protocol such as Zigbee (i.e., an IEEE 802.15.4-based specification for a suite of high-level communication protocols used to create personal area networks with small, low-power digital radios) or Bluetooth (i.e., a wireless technology standard for exchanging data over short distances from fixed and mobile devices, and building personal area networks) that will transmit signals to the master control unit (MCU) 525 or other remote device such as a laptop, tablet, or cell phone. The transmitted data is acquired from the various sensors installed on the trailer 520 or asset. In the embodiment shown, light failure detection system 540 is integrated with the nosebox assembly 541.

The telematics system 500 uses a cellular based trailer intelligence system to provide transportation companies with real-time updates of a trailer's roadside status. Telematics system 500 includes interior and exterior sensors. The exterior sensors include at least light failure detection system 540, a warning sensor 532, such as an anti-lock braking system (ABS) monitoring sensor 532, and tire pressure/inflation sensor. The interior sensors include at least a temperature sensor 528, cargo load detection sensor 530, and a door position detection sensor 529. A dispatcher evaluates the trailer's condition remotely, by utilizing an online dashboard, or via a remote user interface, prior to dispatching a driver. If a failure occurs, the dashboard will instantly notify the dispatcher. If the trailer 520 is experiencing a failure, it will highlight the failure in red (or any other indication of color or patterning) with a fault code. A wireless network is provided around the trailer using a solar-powered master control unit (MCU) 525 placed on the roof of the trailer. Wireless sensors are then placed inside and outside of the trailer. If a failure occurs, the telematics system will instantly detect it and report the failure to an alert dashboard at a remote or local user interface.

In one embodiment, the ABS monitoring sensor 532 detects if the ABS light illuminates. When tethered to a tractor, the sensor reports the information to the system 500, and indicates the failure to the alert dashboard. Multiple tire pressure monitoring sensors detects if a specific tire pressure is too low or if the inflation system has been running too long. The information reported back to the alert dashboard depends on the type of tire system installed on the trailer. Real-time updates from the temperature sensor provides the customer with time and location stamped temperature history during transit. Real-time updates from the cargo load detection sensor 530, allow the customer to know exactly when a trailer is loaded or unloaded. The cargo detection zone is located directly under the sensor's location. Real-time updates are also provided from the door sensor to provide the customer with time and location stamped door positions. Custom alerts can be setup for unauthorized door openings or improper closing, to help detect theft and product contamination.

FIG. 1 shows the telematics system 500 for use with a truck trailer 512 having top 514, bottom 516, front 518, and side surfaces 522 and 523. Doors 519 are positioned at a back end of truck trailer 512. Truck trailer 512 may be a dry-van semi-trailer shipping container or a refrigerated shipping container. Master control unit (MCU) 525 attached to top 514 of truck trailer 512. Wireless sensors, such as a temperature sensor 528, three-axis accelerometer door sensor or door position detection sensor 529, an ultrasonic load sensor or cargo load detection sensor 530 are positioned within trailer 512 and are in wireless communication with a local wireless network master transceiver module of the MCU 525. Warning ABS sensor 532, bridge integrator unit 600, and light failure detection system 540 are all located external to the trailer 512.

As shown in FIG. 2, MCU 525 includes solar cells 550 and an electronics module 552, which are integrated into a one-piece unit as described below. MCU 525 is comprised of at least about six main parts: a cellular module, a GPS, an RF wireless xBee module, a microcontroller, a rechargeable lithium-ion battery and a military grade flexible solar film. Charging circuitry allows MCU 525 to use on average 3% of the battery while charging as much as 15% per hour. In the absence of sunlight, MCU 525 continues to report for 60 days due to specialized back-off controls. The solar panel continues to charge even in low sunlight conditions and heavy cloud coverage. The solar cells 550 converts light energy, such as from the sun, into power for operation of the electronics module 552. The local wireless network master transceiver module of MCU 525 comprises the master node in a local wireless network with the wireless sensors. An exemplary wireless network uses the hardware specified by IEEE standard 802.15.4 coupled with a proprietary communication protocol. The local wireless network allows sensor data from wireless sensors in the network to be gathered by MCU 525 and transmitted using the cellular data transceiver module of MCU 525.

Examples of the MCU 525 are: 005-197-502-Verizon (CDMA) with internal Zigbee—allows use of additional sensors, such as temp, cargo, door, and fuel sensors; 005-197-501—AT&T (GSM) with internal Zigbee—allows use of additional sensors, such as temp, cargo, door, and fuel sensors; 005-198-502—Verizon (CDMA) without internal Zigbee—tracking only, no additional sensors; 005-198-501—AT&T (GSM) without internal Zigbee—tracking only, no additional sensors.

Figure 3A:
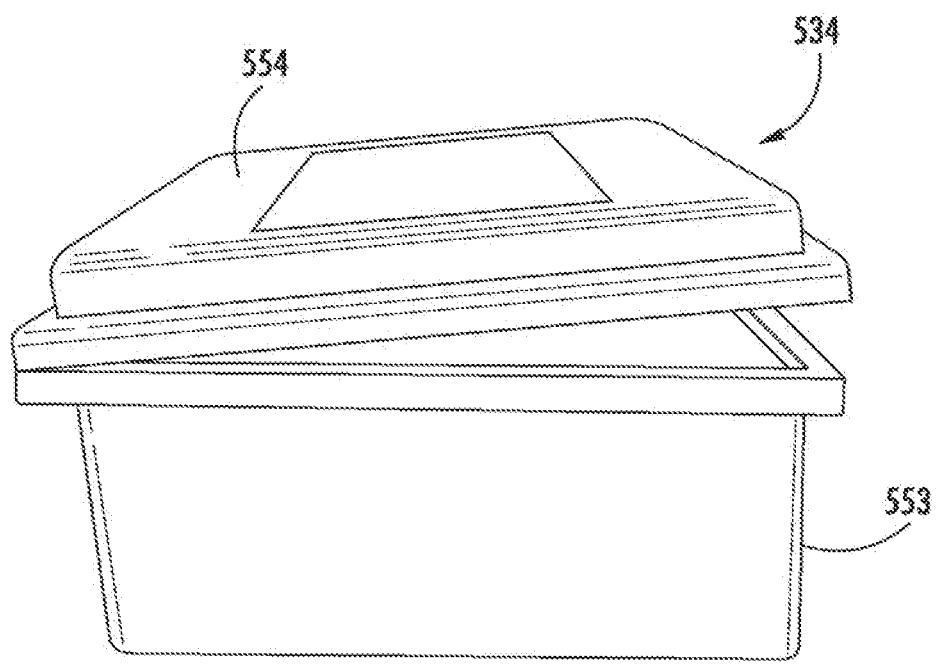
FIGS. 3A and 3B are side open and top open views of a bridge integrator unit, respectively.
Figure 3B:
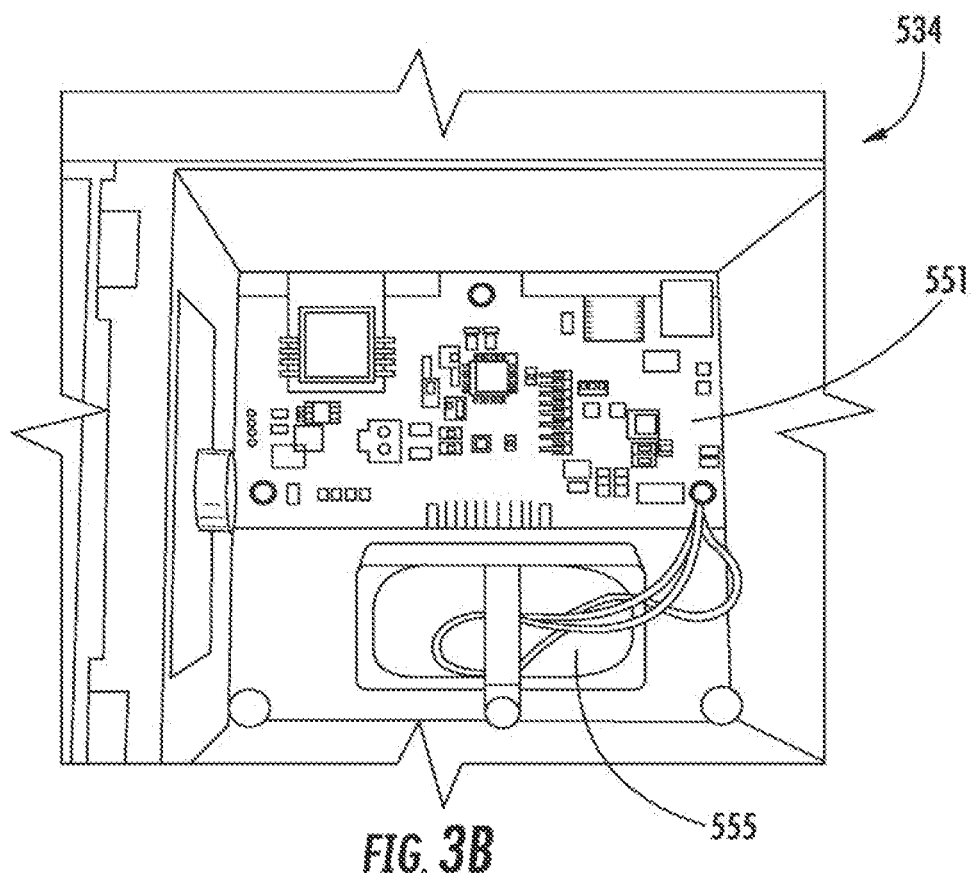

As illustrated in FIGS. 3A and 3B, a bridge integrator unit 600 is shown in side open and top open views, respectively. Bridge integrator unit 600 includes a plastic enclosure 553, with a cover 554 and sealing interface 555 for internal power and ground wires. The bridge integrator unit uses a direct sequence spread spectrum (DSSS) radio module to gather RF signal data from products installed on trailer 512.

In one embodiment, the radio communications are used with STEMCO RF signal data, for exemplary purposes and not limitation, from STEMCO products, such as an automatic tire inflation system, a mileage sensor, or a single or dual tire pressure monitoring sensor. Bridge integrator unit 600 may be referred to as a "smart bridge", or hub, due to its functionality of bridging (and/or translating) communications of customer products, (e.g., here, STEMCO products) with communications to the MCU 525. The bridge integrator unit connects directly to the customer device communications, for example, RS232 or CAN bus, or through a WiFi connection via RF communications, and serves as a hub to translate the communications to a remote server. To that extent, the bridge integrator unit comprises hardware, software, and firmware.

Bridge integrator unit 600 includes circuitry, as shown on circuit board 551, that translates a signal from one communication signal into another messaging format. For example, an RF signal from the sensors may be translated into a secondary messaging format. Once the signal is converted to the secondary format, the messages are delivered to MCU 525 through a ZigBee network. The low power communication protocol ZigBee is power efficient and has additional capability to extend the network. Bridge integrator unit 600 may be powered by a blue circuit wire and/or a rechargeable lithium-ion battery.

Figure 4A:
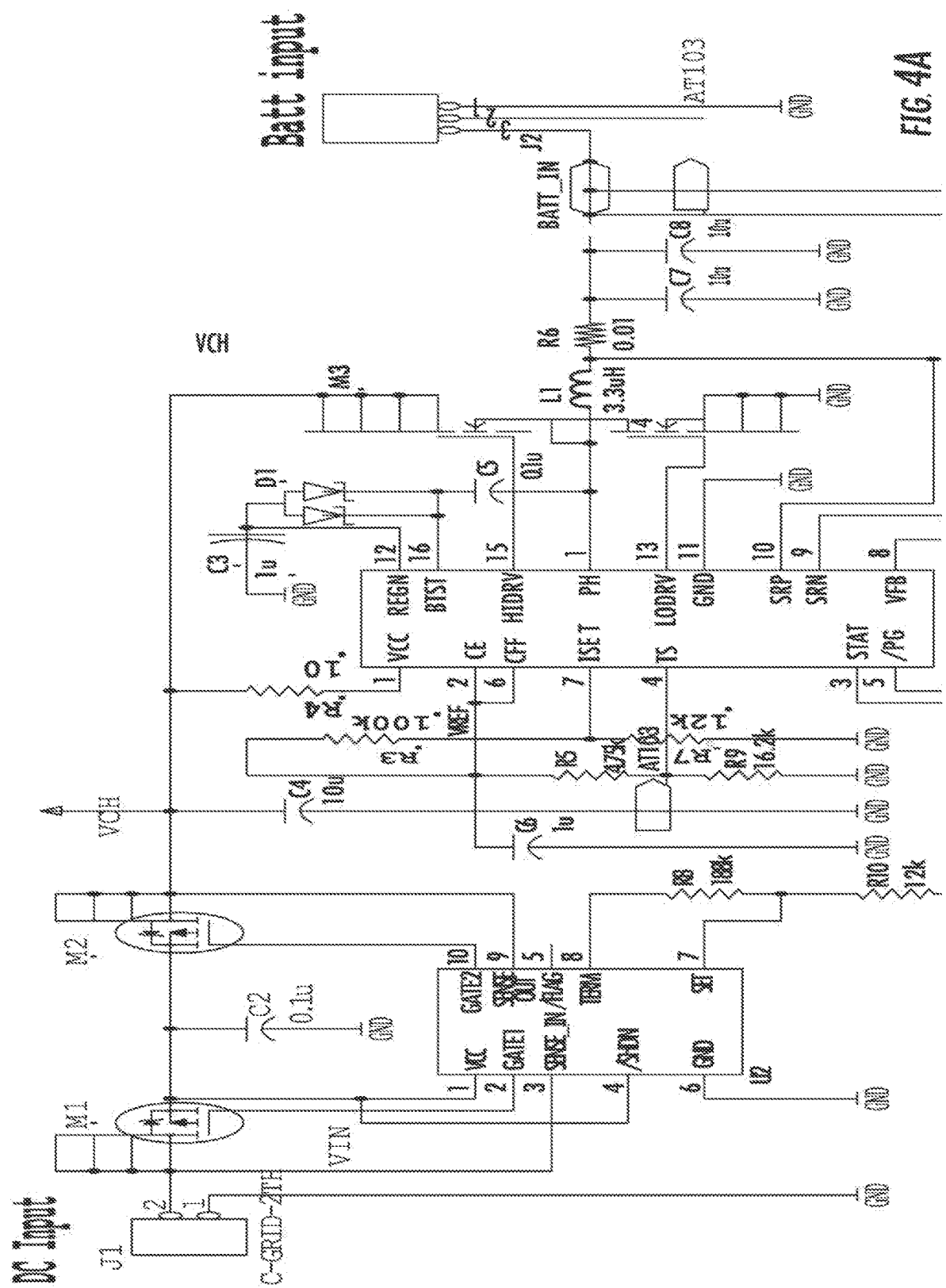
Figure 4C:
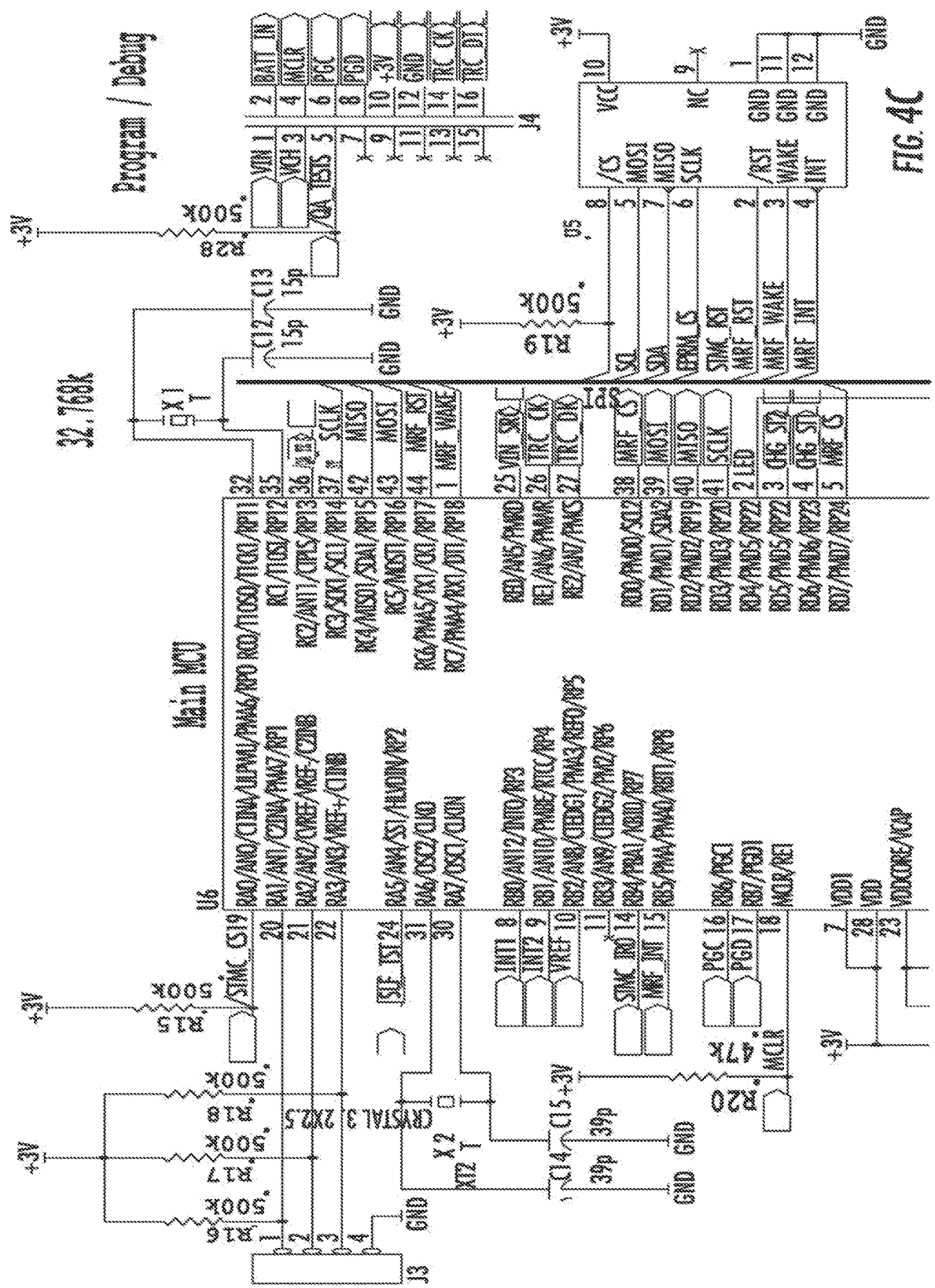
Figure 4D:
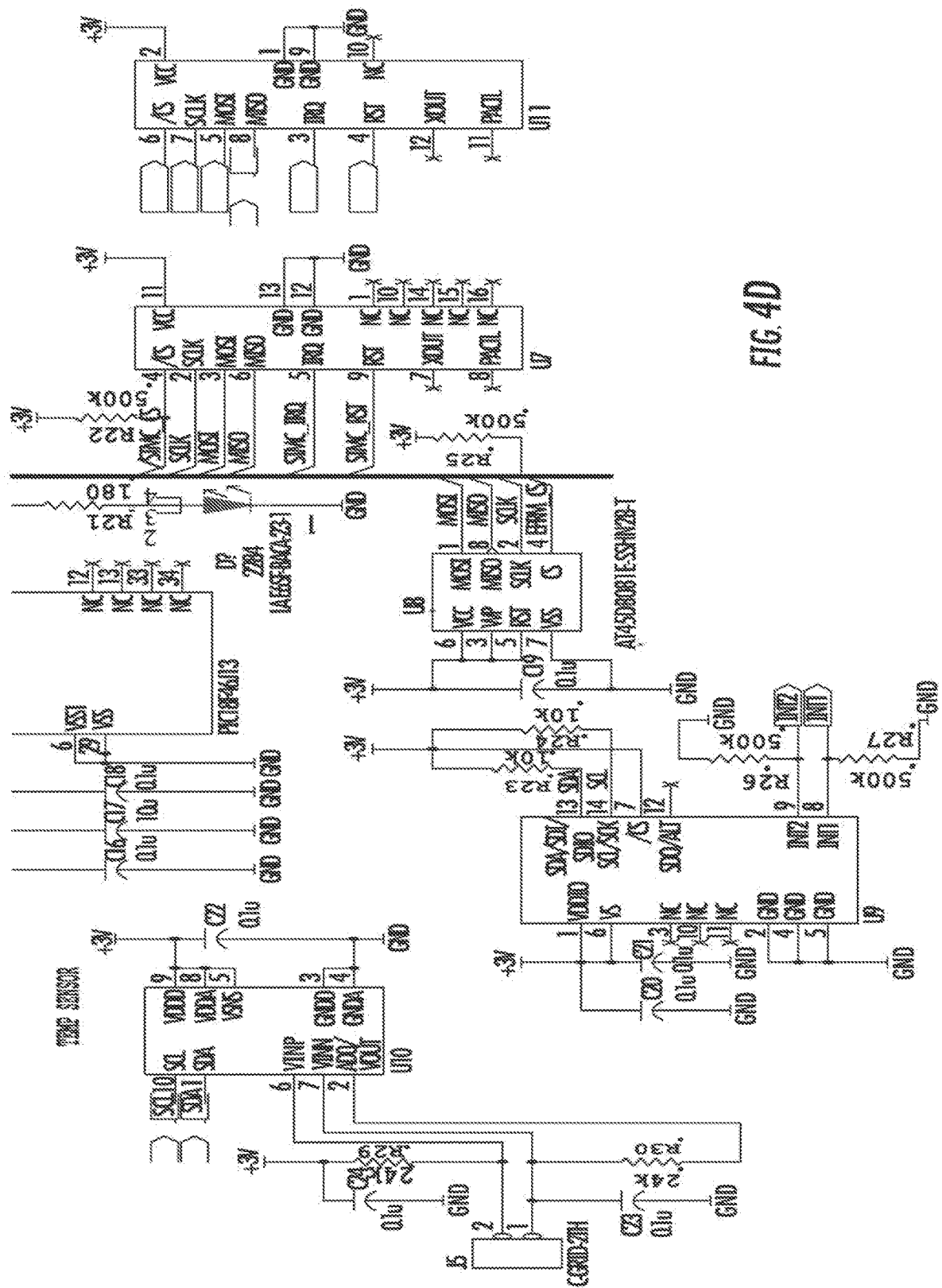

FIGS. 4A-4D are examples of detailed circuitry for bridge integrator unit 600. FIG. 4A shows U2, which is one diode circuit to reduce losses. The remainder of the circuit provides battery charge current. FIG. 4B shows U1, which is an OP AMP used to buffer/measure the voltage at the battery as it is charging. U4 provides regulated 3V power for the system. FIG. 4C includes main controller (U6), and IEEE 802.15.4 transceiver (U5) for connection to the Zigbee network and communication with MCU. FIG. 4D includes a temperature sensor to monitor ambient temperature (U10), an extra memory for controller (U8), a 2.4 GHz wireless modem for non-Zigbee communication (U11), and an accelerometer (U9) to detect when the vehicle is in motion.

Figure 5A:
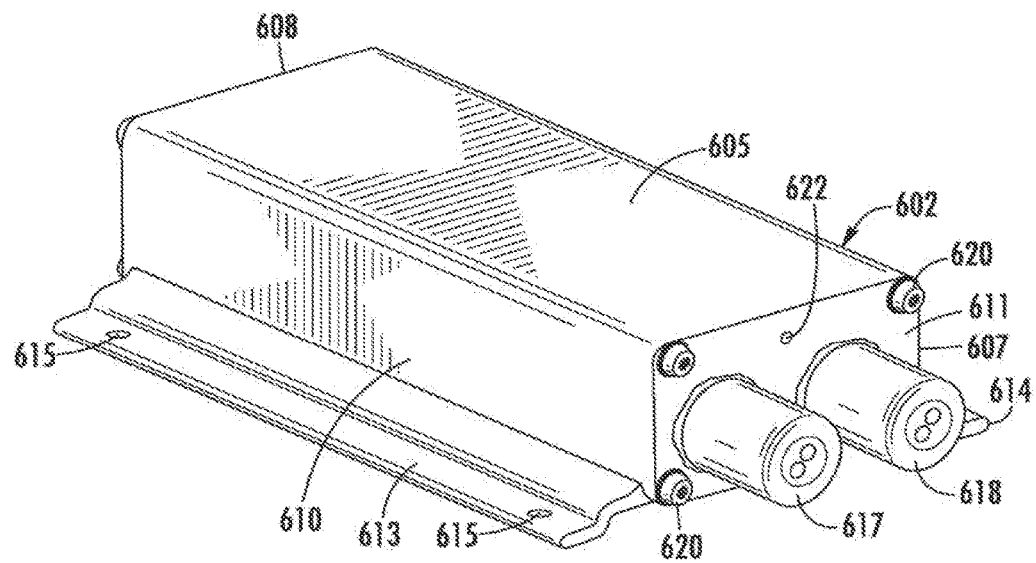
FIG. 5A illustrates a three-dimensional representation of one embodiment of a bridge integrator unit.
Figure 5B:
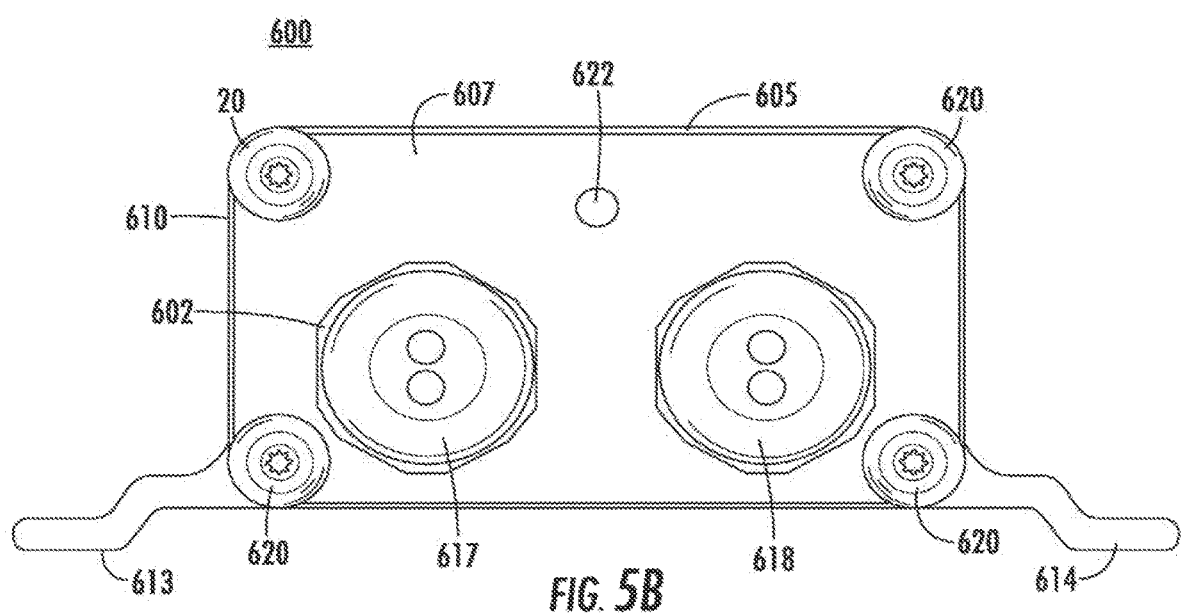
FIG. 5B illustrates an end view of the bridge integrator unit of FIG. 5A.
Figure 5C:
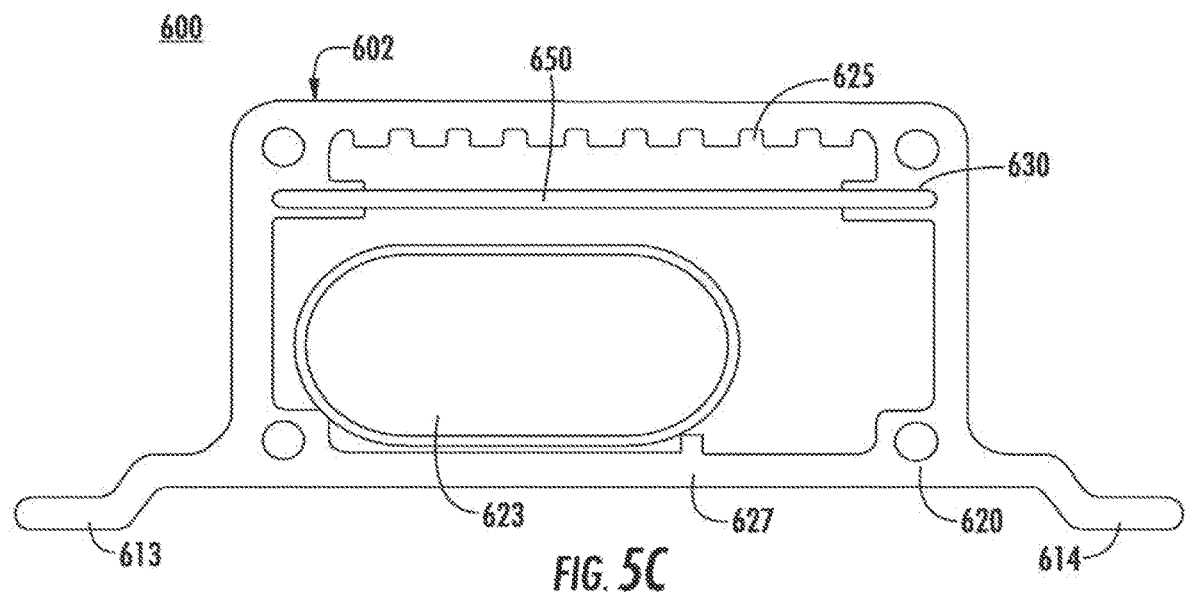
FIG. 5C is a cross-sectional view of the bridge integrator unit of FIG. 5A.

Embodiments of a bridge integrator unit, or bridge integrator unit, are described as follows in FIGS. 5A-5F, FIG. 5A illustrates a three dimensional perspective view of a bridge integrator unit 600. Bridge integrator unit 600 is configured to be coupled to a surface of a trailer or other mounting structure and may have various shapes and structures depending upon the surface of the trailer. The embodiments detailed herein represent, but are not limited to, bridge integrator unit 600 having a stepped mount sealed housing (FIGS. 5A-5C) and a flat mount sealed housing (5D-5E). FIGS. 5A, 5B, and 5C illustrate three-dimensional, side and cross-section views of bridge integrator unit 600 having a stepped mount sealed housing 602 configured to be coupled to a stepped or un-stepped surface of a trailer. Housing 602 includes a top surface 605, a bottom surface 606, first and second ends, 607 and 608, and first and second sides, 610 and 611. Each of first and second sides, 610 and 611, and a laterally extending stepped flange 613, 614 extending therefrom. A plurality of apertures, each indicated at 615, are formed in first and second laterally, extending stepped flanges, 613 and 614, for receiving fasteners for mounting bridge integrator unit 600 to a surface of a trailer or to a mounting structure. FIG. 5B is an end view of bridge integrator unit 600. First end 607 includes openings (not shown) through which overmolded connectors 617, 618 extend for coupling to power and ground wires. As illustrated, ends 607, 608 of housing 602 may be end plates fastened to housing 602 with a plurality of fasteners, such as screws 620. Other configurations of housings, however, may be permitted to serve similar design and functionality.

Bridge integrator unit 600 may either receive power from an external source, such as a blue line power of a trailer, or a backup battery 623, such as a rechargeable lithium-ion battery, as shown in FIG. 5C. Further, the lithium-ion battery may be used to deliver constant power to the bridge integrator unit 600 via a blue circuit wire. The embodiments described herein are not limited to lithium-ion battery for delivering power to bridge integrator unit 600. Other types of batteries for example, aluminum-ion battery, vanadium redox battery, zinc-bromine battery zinc-cerium battery, lead-acid battery, thin film lithium-ion battery, magnesium-ion battery molten salt battery, nickel-cadmium battery, etc. may also be used to deliver power to bridge integrator unit 600.

In addition, a light emitting diode indicator light 622 is provided to indicate the status of bridge integrator unit 600. In one embodiment, an LEI) typically ranging from 520 nm<λ<550 nm may be used to indicate status of bridge integrator unit 600. For example, indicator light 622 may emit green light when bridge integrator unit 600 is in an active state and no light when bridge integrator unit 600 is turned off.

FIG. 5C further illustrates housing 602 having support ribs 625 to reinforce the strength of housing 602 and a support element 627 for securing battery 623. A slot 630 is also provided for supporting the circuit board 650 (See FIG. 5F) within housing 602.

Figure 5D:
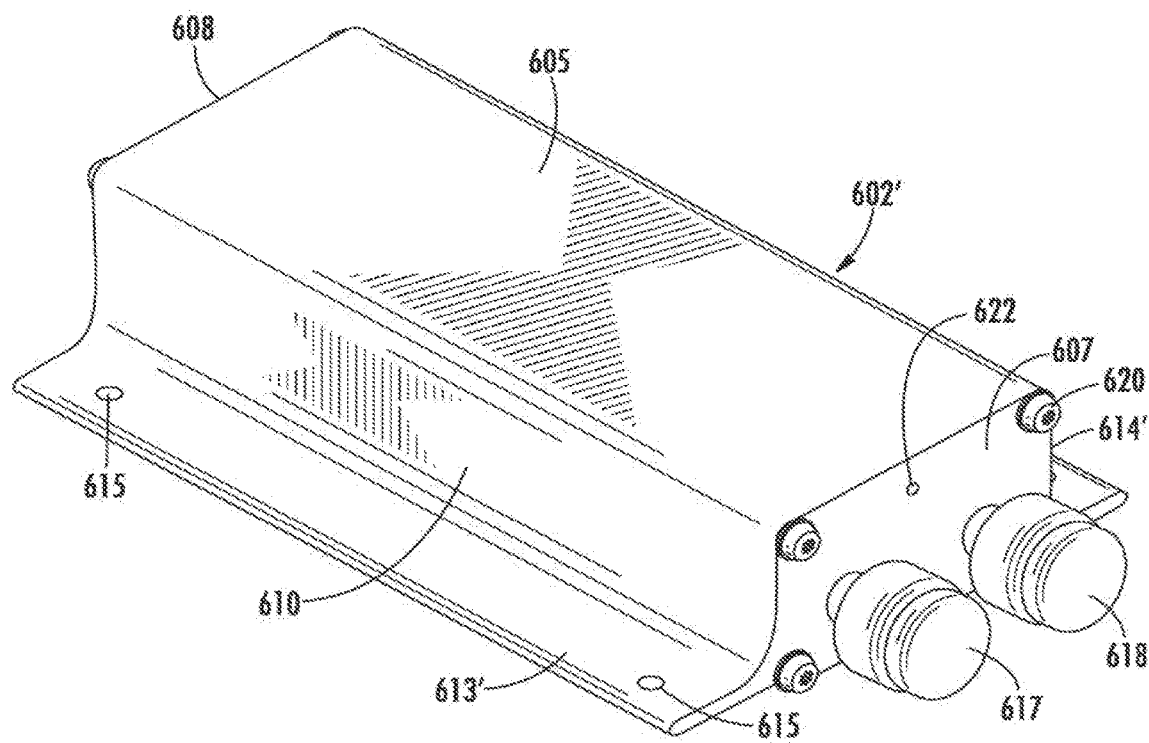
FIG. 5D illustrates a detailed three-dimensional representation of another embodiment of a bridge integrator unit.
Figure 5E:
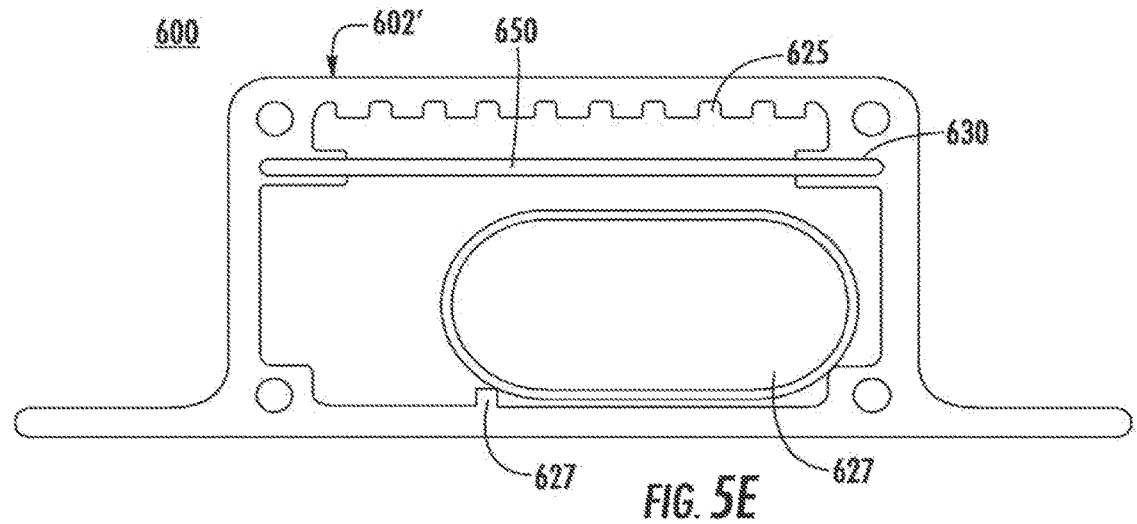
FIG. 5E is a cross-sectional view of the bridge integrator unit of FIG. 5D
Figure 5F:
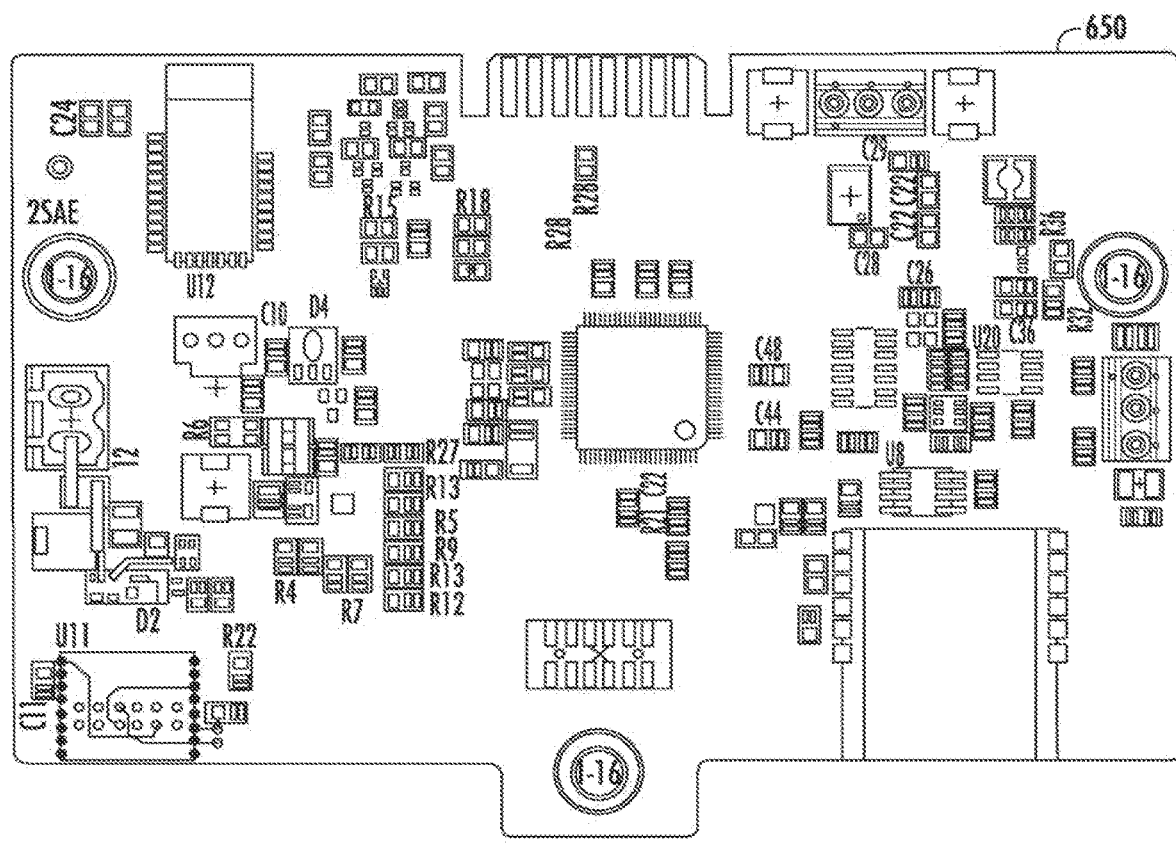
FIG. 5F represents a layout of a printed circuit board (PCB) in one embodiment.

FIGS. 5D and 5E illustrate detailed three-dimensional and cross-sectional views of bridge integrator unit 600 with a flat mount sealed housing 602' which may be coupled to flat surface of a trailer. Housing 602' includes a top surface 605, a bottom surface 606, first and second ends, 607 and 608, and first and second sides, 610 and 611. Each of first and second sides, 610 and 611, has a laterally extending flat flange extending therefrom at 613' and 614'. A plurality of apertures, each indicated at 615, are formed in first and second laterally extending flat flanges, 613' and 614', for receiving fasteners for mounting bridge integrator unit 600 to a flat surface of a trailer or mounting structure. Each of the remaining components of bridge integrator unit 600 shown in FIGS. 5D-5E correspond to those discussed for FIGS. 5A-5C. FIG. 5F is a detailed view of an exemplary circuit board 650 for use with bridge integrator unit 600.

Figure 6:
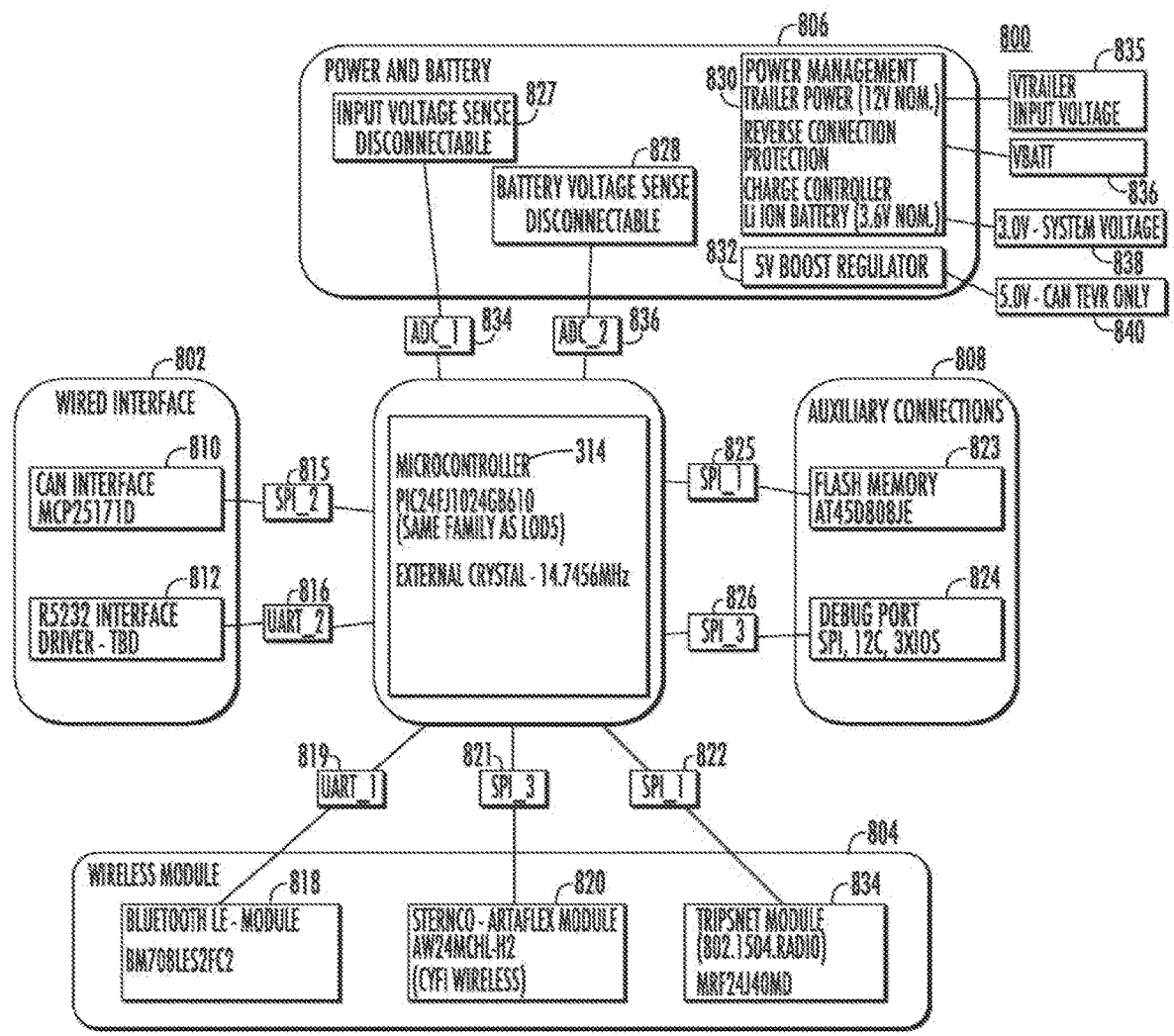
FIG. 6 illustrates a detailed representation of various modules of a bridge integrator unit.

In accordance with above embodiments, bridge integrator unit 600 may comprise various modules. FIG. 6 illustrates a detailed representation of bridge integrator unit 600 comprising various modules. Bridge integrator unit 600 comprises a power/battery module 806, a wired interface 802, a microcontroller 814, wireless modules 804, and auxiliary connections 808. In addition, the bridge integrator unit 600 also comprises various interfaces such as serial peripheral interface (SPI), universal asynchronous receiver-transmitter (UART) and analog-digital conversion (ADC) interfaces.

Bridge integrator unit 600 may utilize the modules for receiving data from one or more sensory devices or a plurality of sensors, and further send the data to a remote user interface. In an exemplary embodiment, the sensory devices installed on the trailer 512 may comprise various types of sensors which are used to sense and/or record values of multiple parameters. The sensors may be wired or wireless sensors; as depicted, for representation and not limitation, the sensors are wireless. Such sensors may include: a temperature sensor 528, three-axis accelerometer door sensor or door position detection sensor 529, an ultrasonic load sensor or cargo load detection sensor 530 etc. The sensors may be positioned on surface of the trailer 512 and may communicate either via wireless interface or via wired interface. The sensors may further send or receive data from a local wireless network master transceiver module of the MCU 525. The MCU 525 may also integrate additional sensors to include customer requested sensory data, as desired, and not limited to, including temperature, tire pressure, trailer weight, cargo, door and fuel sensors, among others for monitoring various parameters of the trailer 512.

In addition, the MCU 525 may also transmit a plurality of signals to the trailer 512 regarding certain conditions or alerts sensed by the warning sensor 532. The sensor 532 generates a plurality of messages such as, P—power up, E—alert, S—Status, R—resolved and Y—acknowledgment which may be transmitted to the trailer 512 from the MCU 525.

In one embodiment, sensory data may be transmitted to a bridge integrator unit, otherwise disclosed as a bridge integrator unit 600 that is capable of intake of a multitude of network communications, specifically radiofrequency identification (MD), a controller area network (CAN bus), universal (synchronous) asynchronous receiver/transmitter (UART), or as specifically designed; the input can then be integrated with the communication architecture to provide an output for communications to a user. The CAN bus standard design allows microcontrollers and devices to communicate with each other in applications without a host computer. Also, the UART is responsible for sending and receiving a sequence of bits, the output of these UART bits usually represented by logic level voltages. These bits can be RS-232, RS-422, RS-485, or perhaps some proprietary specification. Here, the use of RS-232 is referenced, as integrated in the bridge integrator unit 600, though the system remains open to the potential for a variety of communications and protocols to be input and integrated at the bridge integrator unit. Messages are sent to the MCU if and when a condition change arises at one of the monitoring sensors on the trailer 512, or when data declines below or exceeds a defined threshold value. An update may also be sent to an operator of the trailer 512, or to a remote interface. In addition, the directionality of messaging can be unidirectional, sending to the MCU; or the directionality may be bi-directional whereby the bridge integrator unit can be queried by a remote device, input with data from an external source, or otherwise automatically queried for data at intervals or set timepoints.

With further reference to FIG. 6, the sensory devices may communicate with the bridge integrator unit 600 through a wired interface 802, which may include a CAN interface 810, a RS232 interface 812, or as selected for directing wiring. In one embodiment, CAN interface 810 is a small-footprint external CAN flexible data-rate (CAN FD) controller that communicates with microprocessor 814 via a serial peripheral interface bus (SPI) 815. The serial peripheral interface (SPI) is a synchronous serial communication interface specifically used for short distance communication, typically embedded in the system(s). CAN interface 810 typically supports two types of formats for transmission and reception of CAN frames, classical format (CAN 2.0B) or CAN flexible data Rate (CAN FD) format as specified in ISO11898-1:2015. Further, CAN interface 810 has an arbitration bit rate up to 1 Mbps and a data bitrate of up to 8 Mbps. Bidirectional communication with bridge integrator unit 600 is achieved by configuration of 31 FIFOs of CAN interface 810. Typically, CAN interface 810 employs a VDD power supply of 2.7V-5.5V for its operation.

A plurality of sensors may communicate with bridge integrator unit 600 via the RS232 interface 812. Data related to the trailer 512 may then be sent to microprocessor 814 via a UART (universal asynchronous receiver-transmitter) 816, The UART may accept data in byte format and may transmit the data in bit format in a sequential fashion, or as desired depending on communication protocols. The RS232 interface 812 may be used to convert logic level signals of the UART to and from the external signaling levels, which may be standardized voltage levels, current levels, or other signals. The received sensor data may be sent by RS232 interface 812 as a time-series of bits. Further, the interface may operate in a duplex manner, supporting concurrent data flow in both directions from the bridge integrator unit 600 and may support both synchronous and asynchronous data transmission.

In addition, the serial peripheral interface bus (SPI) is a synchronous serial communication interface specifically used for short distance communication, typically embedded in the system(s). SPI devices communicate using master-slave architecture with a single master device or with one or more slave devices. Multiple slave devices are supported through selection with individual slave select (SS) lines.

As also shown in FIG. 6, bridge integrator unit 600 includes a microprocessor 814, which is a 24-bit processor, e.g. PIC24FJ microcontroller with integrated peripherals for segmented or graphical displays, USB-OTG, motor control and capacitive touch implementation. Microprocessor 814 may also have intelligent analog integration, and include 10, 12, 16, 20 bit processors, -bit analog-to-digital converters (ADCs), digital-to-analog converters (DACs), and operational amplifiers in the smallest form factors available. Microprocessor 814 receives data from one or more of wired interface 802, wireless modules 804, and auxiliary connections 808. Data may then be sent to MCU 525. Thus, the bridge integrator unit 600 may be referred to as a hub to intake data coming from sensory devices that belong to different manufacturers and translate that data to a uniform language for communication with a master control unit that updates an operator or user at a user interface. Sensory devices having multiple communication channels, such as RS232, CAN, and UART may transmit and receive messages in a comma delimited format, or as otherwise designed, to and from bridge integrator unit 600.

In the embodiment shown in FIG. 6, wireless modules 804 are adapted to transmit and receive data between bridge integrator unit 600 and MCU 525. Wireless modules 804 comprise, for example, a Bluetooth module 818, a radiofrequency module 820 and internal wireless protocol module 834. Bluetooth module 818 transmits data received wirelessly from the sensory devices to microcontroller 814 via. UART transmitter 819. Radiofrequency module 820 and internal wireless protocol module 834 transmit data received from the wireless sensory devices to microcontroller 814 via one or more SPIs 821 and 822, respectively.

Internal wireless module 834 also can transmit data directly to MCU 525. Sensory data from multiple communication protocols is translated at the internal wireless module 834 to a firmware language that communicates directly with the MCU 525, and using a radio frequency band of IEEE 802.15.4 or other wireless communication. The module 834 may be a 2.4 GHz IEEE Std. 802.15.4 compliant, surface mount module with integrated crystal, internal voltage regulator, matching circuitry, power amplifier (PA), low noise amplifier (LNA) with PCB trace antenna (MRF24J40MD) or 50Ω external antenna connector (MRF24J40ME), or other compatible device comparable in the state of the art. The module 834 is configured to operate in a non-licensed 2.4 GHz frequency band and may minimize use of extensive RF and antenna design. In one embodiment, the module 834 is based on microchip technology of MRF24J40 2.4 GHz IEEE 802.15.4 RF transceiver IC. After the sensory data is converted into a common protocol, the data is transmitted to MCU 525. The MCU controls a local wireless network master transceiver module to periodically obtain sensor data from one or more wireless sensors directly, or through a bridge integrator unit that translates the message to a readable form, and further controls access to the data via a cellular data transceiver module to transmit location and sensor data of trailer 512 to a remote user interface. The bridge integrator unit system of FIG. 6 utilizes wired interfaces 810, 812, alone or in combination with wireless RF module 820 to pull information from wireless sensors on a trailer (or other external tracked asset) into the processor that is part of microcontroller 814. The processor translates the message received from those communication avenues into a secondary communication protocol to provide messaging and communication feedback to an operator or user at a user interface. The secondary communication protocol can be queried directly from the user interface, or may be displayed at the user interface via the messaging through the MCU of the trailer. Either way, direct or indirect access through the MCU, the data conveyed via the bridge integrator unit is consistent with ongoing user communications and displayed in real-time. The bridge integrator unit may be accessed remotely via the user interface, or through the MCU, in real-time.

Bluetooth LE module 818, as shown in FIG. 6, is a low-energy Bluetooth module, which supports UART, I2C, and SPI interfaces. Bluetooth module 818 works on an ISM Band from 2.402 GHz to 2,480 GHz over 0-39 channels and typically has a reception sensitivity of −90 dBm. In addition, Bluetooth module 818 may provide operate in low energy conditions for embedded applications. It conforms to Bluetooth core specification version 4.2 to enhance the throughput and security for IoT applications. Bluetooth module 818 may also support bacon technology to enhance user experience for the IoT applications and enables users to control data in the cloud and receive data without opening the application through a smart phone. Bluetooth stack is integrated and is available in different form factor to optimize the space, cost, and RF performance. For portable and wearable applications, it provides power-optimized design to minimize the current consumption to extend the battery life.

As further shown in FIG. 6, RF module 820 may be a AW24MCHL-H2 transceiver in wireless modules 804 which has a 2.4-GHz direct sequence spread spectrum (DSSS) complete radio module and includes Cypress radio integrated circuit CyFi™ CYRF7936, integrated antenna, and various external components. The wireless RF module offers a radio module solution for integration into existing or new 2.4-GHz products. Data from the RF module 820, and associated sensing units, is sent to the bridge integrator unit 600 via the SPI bus for data transmission/reception to MCU 525.

Bridge integrator unit 600 also includes auxiliary connection module 808 with a flash memory 823 and a debug port 824. Embodiments herein may incorporate various auxiliary connections as needed for storage and retrieval of information, security systems, or otherwise. To allow for simple in-system re-programming, flash memory 822 may utilize lower voltages for programming. Memory 822 may operate from a single 1.7V to 3.6V power supply for the erase and program and read operations. Flash memory 822 is enabled through the chip select pin (CS) and accessed via a 3-wire interface consisting of the serial input (SI), serial output (SO), and the serial clock (SCK). It is compatible with SPI 825 for communication with microcontroller 814. Debug port 824 is used to simplify development and debugging, but its functions are not limited and can be used for multiple functions by a person skilled in the art. Data to/from microprocessor 814 is transmitted from/to the debug port 824 via an SPI interface 826. Debug port 824 is compatible with low end communication protocols such as PC (e.g., for 'Inter-Integrated Circuit', protocol) and SPI (e.g., for 'Serial Peripheral Interface'), among others. Both protocols are well-suited for communications between integrated circuits, and for slow communication with on-board peripherals.

Bridge integrator unit 600 further includes a power and battery sub-system 806, which includes a disconnectable input voltage sense sub-system 827, a disconnectable battery voltage sense sub-system 828, a power management sub-system 830 and a boost regulator 832. Power supplies are often designed to operate in 120 VAC and 220 VAC input voltage range. By using an automatic disconnectable input voltage-sensing switch 827, as shown in FIG. 6, the input voltage can be sensed so that the power supply can automatically switch between two or more input ranges. An analog-to-digital converter (ADC_1) 834 converts an analog signal from the power supply into a digital signal to be sent to microcontroller 814. In addition, power and battery sub-system 806 also includes a disconnectable battery voltage sense unit 828 for sensing a battery's voltage. The sensed voltage may be translated and sent to microcontroller 814 via an analog-to-digital converter (ADC_2) 836, which converts an analog signal from the power supply into a digital signal to be sent to microcontroller 814. Further, the battery back-up system described here allows for a trailer to be monitored via the bridge integrator unit when tethered with direct battery connection, and for communication with the bridge integrator unit when the trailer is untethered from a tractor. Power and battery sub-system 806, as shown in FIG. 6, also includes power management sub-system 830 for regulating the trailer's input power supply, which may be from input trailer voltage 835, voltage from a battery 836, or system voltage 838. Under normal operation, the trailer's input voltage is about 12 volts, but may be modified as appropriate or desired to provide power efficiency and maintenance. Power and battery sub-system 806 also includes reverse connection protection and a lithium ion battery, which may have an input voltage of 3.6 volts under normal operation. Additionally, a boost regulator 832 is provided which may receive power from a CAN transceiver (e.g., active receiver antennae) 840, or any suitable DC sources, such as batteries, solar panels, rectifiers and DC generators. In the present embodiment, the boost regulator 832 is a DC to DC converter providing 5 volts greater than the source voltage. Boost regulator 832 may also be referred as a step-up converter since it "steps up" the source voltage.

Figure 7:
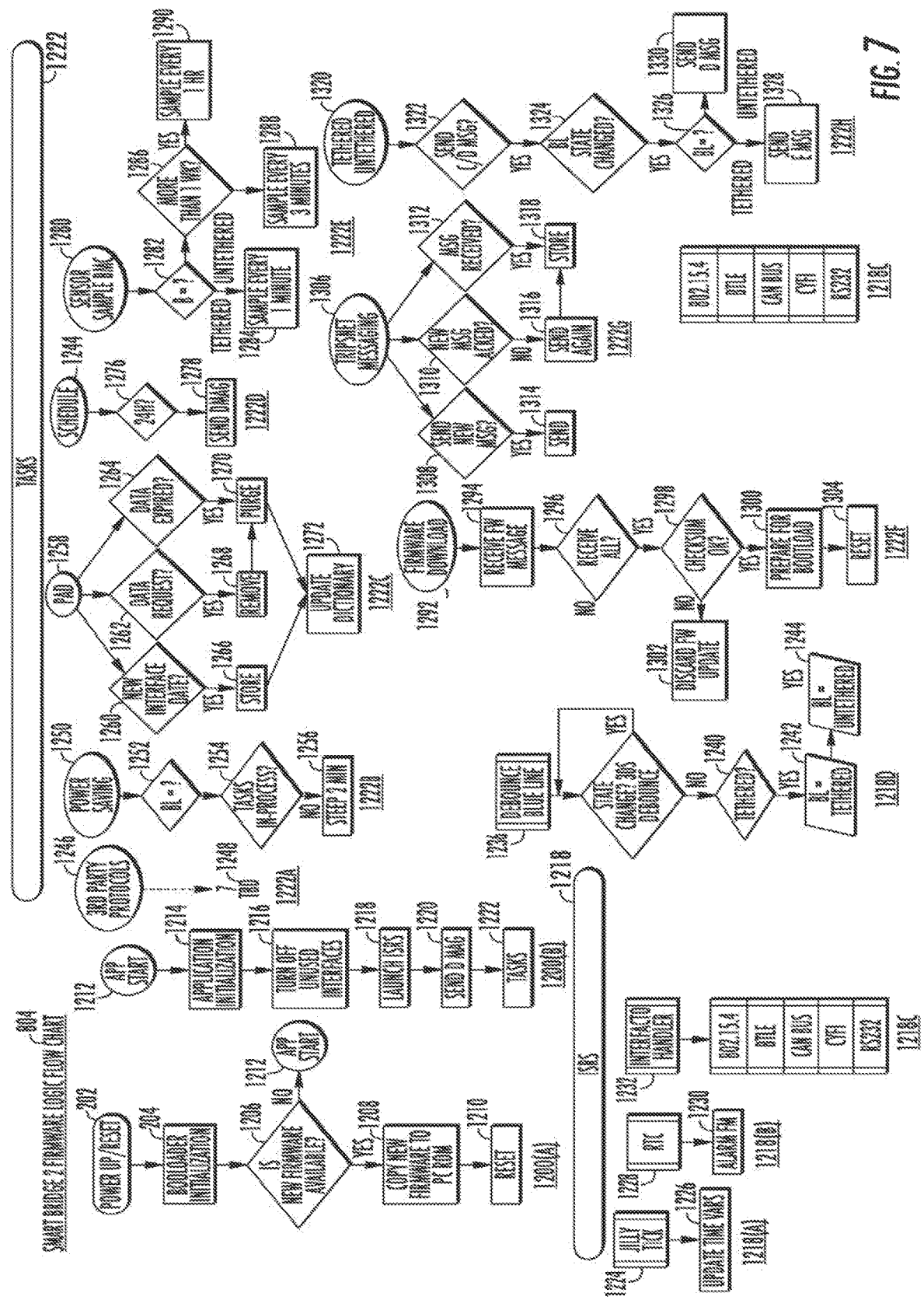
FIG. 7 illustrates a schematic as to operation of an embodiment of a bridge integrator unit.

With reference to FIG. 7, the system 1200 illustrates a process at 1200(A) to start-up 1202, bootload initialize 1204, and upgrade 1206 prior to any launch of interrupt service routines (ISRs) 1218 for communications through the application initialization 1214, and/or execution of associated tasks 1222 via the process at 1200(B).

In FIG. 7, a power up or reset signal 1202 is generated when power is applied to bridge integrator unit 600. At step 1204, the boot loader present in the framework 1408 (See FIG. 8) is initialized and loads system software for the bridge integrator unit, or bridge integrator unit 600. The logic proceeds to inquire at 1206 as to any firmware or upgrades for the system. If additional or revised firmware is available, a copy of the firmware is copied to a microchip controller at 1208. Here, the controller is represented as a PIC controller ROM. This is comparable to a software update followed by an upload and/or restart of the system. If not updated firmware is available, the integration application proceeds to start at 1212. The application is initialized at 1214, followed by a step of turning off any unused interfaces 1216. For exemplary purposes, and not limitation, if not using a UART connection, and a CAN bus instead, then the UART can be switched off. The ISRs are launched 1218, generating a dispatch message at step 1220, through a protocol 1404, as encoded at the dictionary or hexadecimal coding level, protocol of which relates to information as to the message designated by the plurality of sensing devices. The messaging protocol here, as encoded by the hexadecimal (or other coding) library, designates the specific tasks 1222 to be monitored. The firmware, as described, indicates when an issue arises as to the specific sensing device parameters, and data that falls outside a range or threshold values so as to indicate the issue.

In reference to the launching of interrupt service routines 1218, the system may handle various types of interrupt service routines (ISRs) such as Jiffy Tick 1224 (i.e., updating time variations 1226) or RTC 1228 (i.e., real-time clock given 1 minute periods 1230, though any designated timing may be utilized) embedded in the framework 1408. An interface handler 1232 of the hardware abstraction layer 1402 has various communication channels 1234 including, but not limited to, RF (802.15.4), BTLE, CAN bus, CyFi, RS232, among others. The blue line 1236 is used to choose an interrupt from a plurality of interrupts and querying as to state changes 1238 having 30 second debounce periods. Here, the status is queried every 30 seconds. The system continues to query here unless there is no state change. The logic queries as to whether the trailer is tethered 1240. If yes, then the blue line is tethered 1242, and the battery connection to the bridge integrator unit is directly connected to the power supplied by the tractor to which the trailer is tethered. If not tethered, the blue line is untethered 1244, and thus the bridge integrator unit proceeds to utilize its battery backup.

Moreover, in logic flow level 1218(C), an interface handler 1232 enables communication between sensors and bridge integrator unit 600 via wired RS232 interface 812 and CAN interface 810, as also previously shown in FIG. 6. The interface handler operates in the hardware abstraction layer (HAL) 1402 of FIG. 8. In addition, the interface handler 1232 enables communication between bridge integrator unit 600 and MCU 525 via a secondary language protocol, (e.g., TRiPS™ Module 834, Bluetooth LE module 818 and RE module 820 as also previously shown in FIG. 6.

Still with reference to logic flow level 1218(C) in FIG. 7, the interface handler 1232 also monitors the tethered/untethered state of the blue power line. The interface handler 1232 also allows a choice of an interface from a plurality of available interfaces. The system may choose a service from 802.15.4, BITE, CAN Bus, CyFi or RS232 interfaces.

Again referring to flow diagram 1200(B) of FIG. 7, after a dispatch message is generated, a plurality of tasks 1222 may be performed by plurality of firmware logic levels 1400. Flow level chart 1222(A) illustrates third party protocols at step 1246, communicating with the remote user interface 255. At step 1248, parameters are customized according to customer demand and sensing units utilized, capturing real-time data from the sensors when queried, such as light failure detection system 540, warning sensor 532, anti-lock braking system (ABS) monitoring sensor 532, tire pressure/inflation sensor, temperature sensor 528, cargo load detection sensor 530, and a door position detection sensor 529. As designated here, the bridge integrator unit queries sensors every 2.5 seconds, or as coded in the system. The data is translated at the bridge integrator unit, and if changed from a previous state or outside a range or threshold, pushes the data to the MCU. The remaining data, static data of which remains unchanged or unused for a certain time period, is removed and conserves storage space.

Further flow diagram 1222(B) illustrates a process to determine if the blue power line of a tractor-trailer is connected to a bridge integrator unit 600. If bridge integrator unit 600 is in power saving mode as shown in step 1250, the blue power line is monitored at step 1252 as to whether the firmware is connected to the blue line. The system 1200 checks to see if tasks are in process at 1254; if no task in process, then bridge integrator unit goes into sleep mode 1256 for a time designated, here at least about 2 minutes.

Further, logic level flow diagram 1222(F) illustrates the downloading of updated firmware at step 1292. A message is received by the bridge integrator unit at step 1294. If the message is not received, the query returns to the firmware receive message 1294. If the message is appropriately received 1296, the check sum of the received data is calculated to determine any erroneous data 1298. If the check sum is okay, the system prepares for bootload 1300, and the system resets 1304. If the check sum is not okay, the firmware update is discarded 1302.

Figure 8:
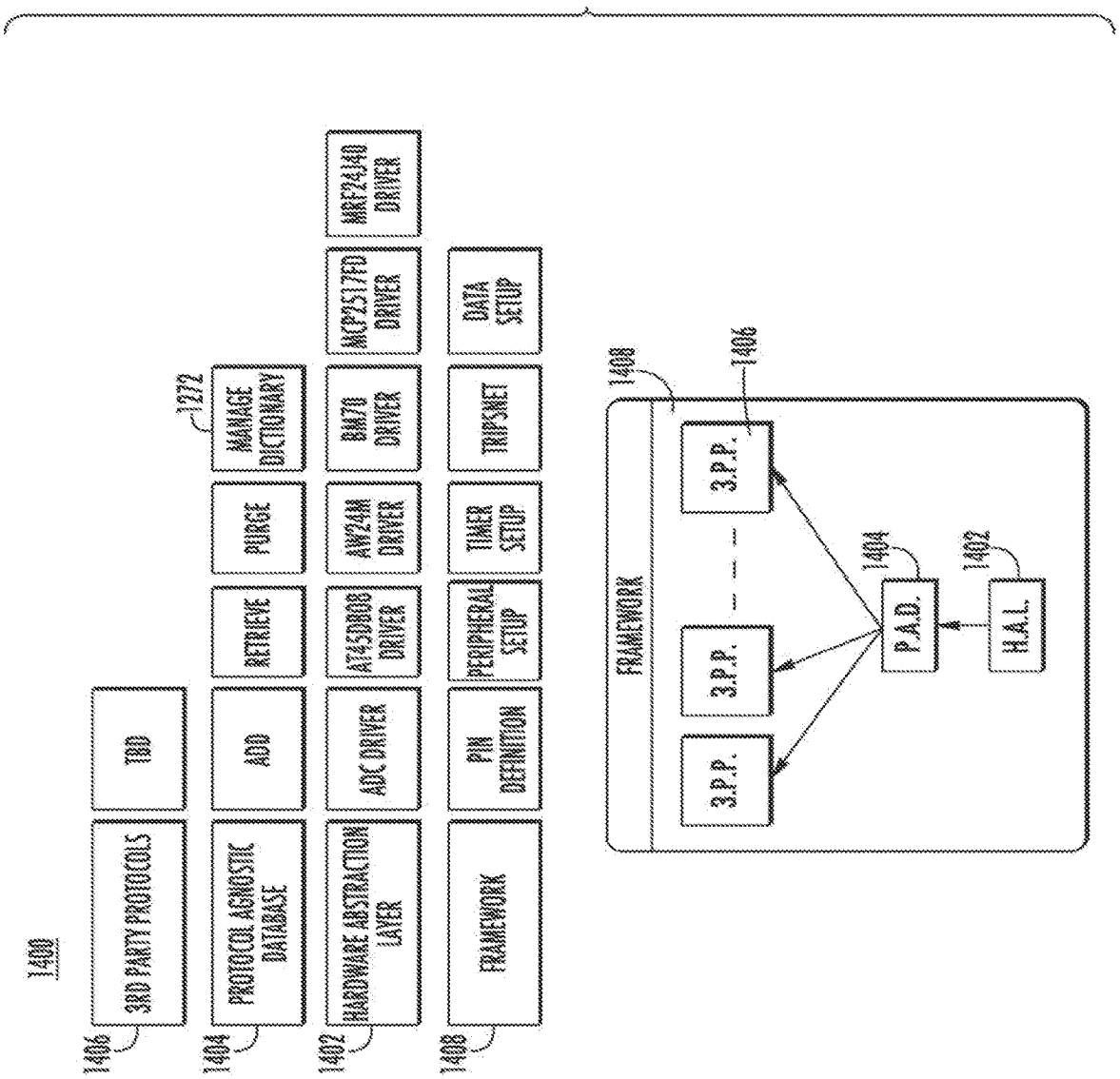
FIG. 8 represents a schematic as to levels of the framework architecture integrated in an embodiment of firmware utilized for an embodiment of a bridge integrator unit.

Within a protocol agnostic database (PAD) 1404 of FIG. 8, the tasks 1222 of the bridge integrator unit firmware logic simultaneously monitors data queried by the MCU. Here, the PAD inquires whether additional interface data is present 1260, whether a data request has been sent 1262, and whether data has expired 1264. If affirmative for any of steps 1260, 1262, 1264, the system intakes various forms of data to store 1266, retrieve 1268, or purge 1270 the data. Note that after the date has been retrieved, it is purged. Following storage 1260 and purging 1270, the dictionary is updated. The manage dictionary functionality of the protocol agnostic database intakes the messaging from RF, CAN bus, and RS232 transmissions and information corresponding to specified sensors within the assigned monitored parameters.

For exemplary purposes, and not limitation, one customer may request tire pressure monitoring. While not having direct access to proprietary protocol implemented in a customer tire pressure sensor or other sensor communications, the smart bridge integrator can interconnect with a device control unit of the particular customer to pull raw data into a user-based system to monitor and access that data via a common interface. The bridge integrator unit facilitates this communication, and rather has the capability to pull all streams of data to translate into secondary messaging to the user, customer, or fleet operations. For exemplary purposes, and not limitation, by integrating with the customer's particular sensors that monitor tire pressure within each tire, the bridge integrator unit intakes the data via a CAN bus communication line, pinging the sensors at regular intervals, such as every 2.5 seconds. The messages are translated, at the bridge integrator unit, for example, encoded into hexadecimal format at the dictionary. If the data is consistent with specifications provided, the system purges the data. If the data changes, to indicate an issue, the bridge integrator unit relays the information in a uniform proprietary language, or secondary language, at a particular RF frequency to a master control unit (MCU). The MCU transmits the information to a designated user interface.

As shown in the embodiment of FIG. 7, logic level flow diagram 1222(G) illustrates the process of TripsNet secondary messaging 1306 initializing followed by queries to send a message 1308, acknowledge a sent message 1310, and query whether a message was received 1312. At step 1308, if a message is generated, a communication to the MCU 525 is transmitted via TripsNet at step 1314. If the sent message is not acknowledged by the TripsNet protocol in the framework of the MCU 525, the message shall be sent again at step 1316. If the message is received b MCU 525 at step 1312, the message is stored 1318.

Continuing with reference to FIG. 7, logic flow chart 1222(D) illustrates a process of transmitting a dispatch message to the third parties. At step 1274, the scheduler monitors the operation of the dispatch message. Once the scheduler detects that time has exceeded a specified time 1276, here 24 hours, the dispatch message is sent 1278.

Further, logic level flow chart 1222(E) monitors the tethered and un-tethered state of the blue power line with the bridge integrator unit. Here, the blue power line is associated with the tractor; and the firmware associated with the bridge integrator unit is in connection with the trailer unit. The sensor sample time is being monitored at step 1280. At step 1282, the blue power line status is monitored. If the blue power line is tethered to the bridge integrator unit, the sensor data is sampled after every 60 seconds at 1284. If the blue power line is untethered from the bridge integrator unit, the system queries whether the bridge integrator unit was untethered for a duration of time at 1286; here, for example, the query asks if the bridge integrator unit was untethered for more than a week. If untethered more than the specified duration of time, sampling of the bridge integrator unit is queried in increments 1290. Here, for example, sampling would then occur every 1 minute. If the blue line is not untethered for more than a week, sampling occurs for another specified period of time 1288, here selected at about every 5 minutes. Note that the tethering of the bridge integrator unit references whether a trailer is connected to the tractor; when untethered, the trailer (and thus, associated bridge integrator unit) is detached, or untethered from the trailer. This allows a user or operator to determine how long a trailer has sat at a delivery, in a parking lot, or at another designated or unknown location.

Further, logic level flow diagram 1222(H) illustrates the process of determining the connection state of the blue power line (BL). The bridge integrator unit monitors the tethered or untethered state 1320 of the blue power line. In the next step, a connection/disconnection message 1322 is sent in order to check whether the status of the blue power line has changed 1324. If the state has changed at 1324, the system queries whether the blue power line is tethered/connected 1326, If the blue power line is tethered at step 1326, a connection message 1328 is sent. If the blue power line is untethered at step 1326, a disconnect message 1330 is sent.

With reference to FIG. 8, a bridge integrator unit system 1100 illustrates a broad view of firmware logic levels of framework 1408 which provide controls for a bridge integrator unit 600, including specific hardware and software/firmware. Framework 1408 may store sensor data. The sensor data may come from light failure detection system 540, warning sensor 532, anti-lock braking system (ABS) monitoring sensor, tire pressure/inflation sensor, temperature sensor 528, cargo load detection sensor 530, a door position detection sensor 529, among other parameter sensing devices and sensors. In an embodiment, the system 1400 an operating environment and architecture for bridge integrator unit and also provides additional levels of programming and integrated hardware and/or software to perform control, monitoring and manipulation of data functions. The system 1400 may be held in a non-volatile memory device which may be flash memory 822 as previously shown in FIG. 6, or storage within the bridge integrator unit.

Here, as shown in the system 1400 as integrated with the bridge integrator unit, the hardware abstraction layer 1402 and protocol agnostic database 1404, along with third party protocols 1406 are built on top of framework 1408. As described prior, the manage dictionary 1272 allows communication and translation of data that is received from either RF, CAN bus, and/or RS232. Various other communications may be identified and integrated at the bridge integrator unit also.

Figure 9:
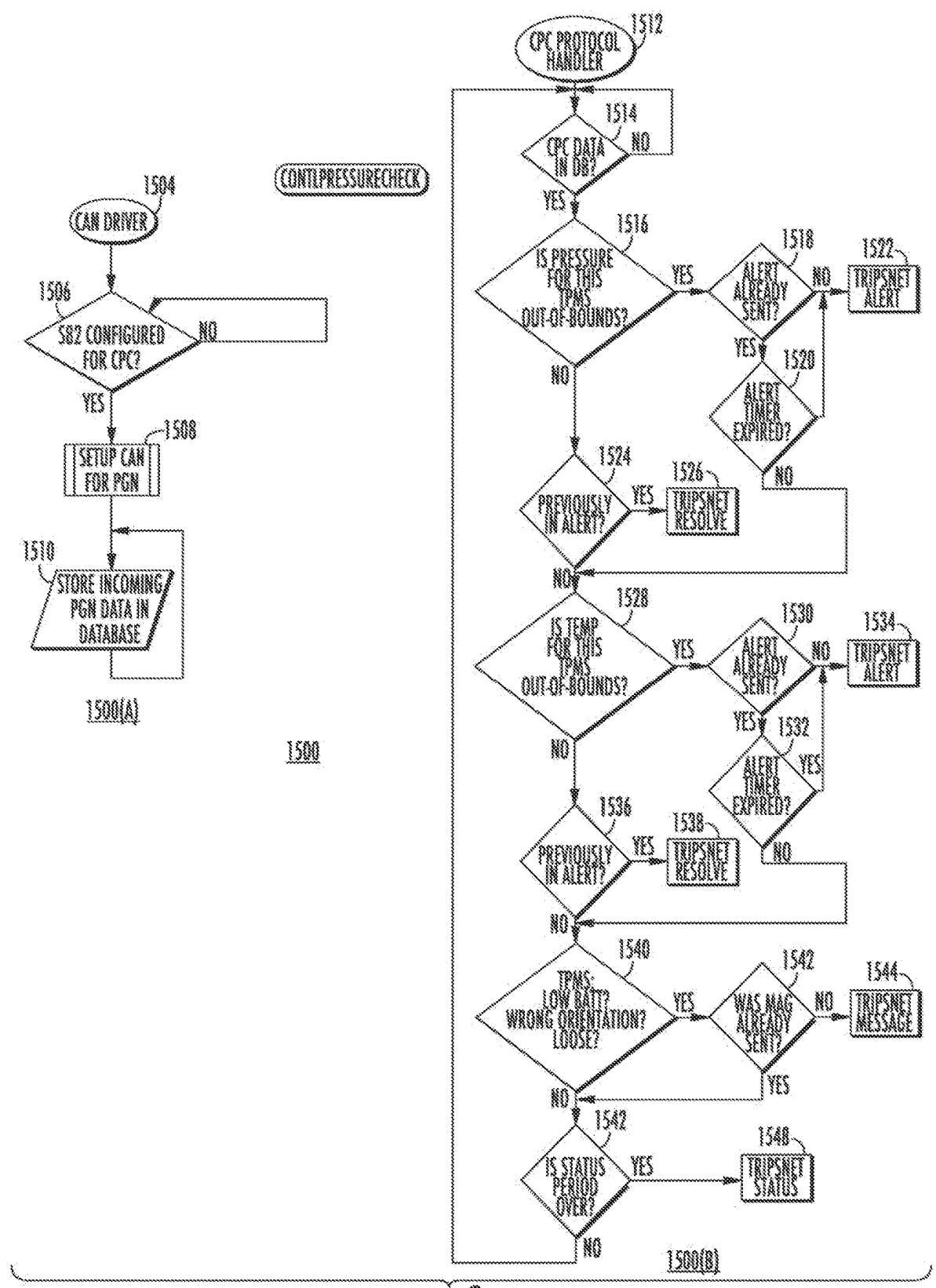
FIG. 9 represents a schematic as to an operational embodiment of a bridge integrator unit.

FIG. 9 represents an example of flowchart logic as to a bridge integrator unit 1500 for a tire pressure sensing system. Whether queried by the MCU of the trailer system at regular intervals or voluntarily and instantaneously from a remote interface, the system 1500 is capable of setting up communications 1500(A) with a third party device and third party communications network. The system further integrates the third party communications 1500(B) for further translation and status update communications to a user interface. The flow diagram 1500(A) establishes whether bridge integrator unit 600 is configured for pressure check (CPC) or not. Once bridge integrator unit 600 is configured for pressure check (CPC), the logic flow level diagram 1500(B) initiates CPC protocol.

At Step 1504, where a device control unit 1604 (will be detailed in the below embodiments) generates a request to obtain CAN driver information. Further, the flow level diagram proceeds to Step 1506, which is a conditional statement to check whether bridge integrator unit 600 is configured for pressure check (CPC) or not. In the case where the bridge integrator unit 600 is configured for pressure check (CPC), the logic level flow proceeds to step 1508. When bridge integrator unit 600 is not configured for pressure check (CPC), the logic level flow waits to configure bridge integrator unit 600 for pressure check (CPC).

The system then sets up the CAN interface for PGN 1508 which is a deeper level firmware for data storage. After setting up the CAN interface for PGN, the logic flow level proceeds to store 1510 the incoming PGN data in the database. The step 1510 works in a loop because the PGN data is not stored in the database for a long duration of time. The data stored in the database is discarded once the vehicle shuts off, or once the signal or issue is resolved. The system is designed to save memory and storage space. As mentioned prior, the data is stored in the database library in hexadecimal format, or coding as desired.

Once bridge integrator unit 600 is configured for pressure check (CPC), the logic flow level diagram 1500(B) proceeds via the CPC protocol handler 1512. The system protocol checks to see as to whether the CPC data is stored 1514 in the database or not. If the CPC data is not stored in the database, the logic flow level waits until the CPC data is stored 1514 in database. Once the CPC data is stored in the database, the logic flow level diagram proceeds to step 1516.

The step 1516 is a conditional statement which checks whether the pressure recorded by tire pressure monitoring system (TPMS) is out-of-bounds or not. If the recorded pressure is out-of-bounds, the logic flow level proceeds to check whether or not an alert has been sent 1518; otherwise the logic flow level proceeds to step 1524. If the alert has not been sent at 1518, then a secondary messaging alert 1522 via a TripsNet protocol is sent to the MCU. If the alert is already sent at step 1518, the logic proceeds to check whether the alert timer has expired at step 1520. If yes, then a secondary messaging alert 1522 via a TripsNet protocol is sent to the MCU. If the alert has not expired, the logic proceeds to check the next condition, here temperature at 1528.

At step 1524, a condition is checked whether the system was previously in alert or not. If the system was previously in the alert state, the logic proceeds to resolve the secondary messaging command at step 1526, here, the TripsNet resolve. Otherwise, the logic flow proceeds to step 1528. Note that the TripsNet resolve command returns the system back to normal after correcting the pressure monitored by the TPMS.

At step 1528, a temperature check is performed for the measured tire conditions. The step 1528 checks whether temperature of the TPMS is out-of-bounds or not. If the recorded pressure is out-of-bounds, the logic flow level proceeds to step 1530 where an already sent alert is monitored, otherwise the logic flow level proceeds to step 1536. The step 1536 checks whether the system is previously in alert or not. In case the system is in the alert state, the logic flow level proceeds to step 1538 where a TripsNet resolve command is issued, otherwise the flow proceeds to step 1540. Tripsnet resolve command returns the system back to normal correcting the pressure monitored by the TPMS.

At step 1530, the logic flow level checks if the system has already sent an alert or not. If the alert is already sent, the logic proceeds to step 1532; otherwise, if the alert is not sent, the logic flow proceeds to step 1600, where the system generates a TripsNet alert. At step 1532, is the system checks if the alert timer has expired or not. If the alert timer has expired, the logic proceeds to step 1600, where the system generates a TripsNet alert; otherwise the logic flow level proceeds to step 1540.

At step 1540 of the logic), various other parameters related to the monitored TPMS are checked, as designated and designed by user, operator, and/or customer. The parameters may be low battery, wrong orientation, loose connections, or other monitoring parameters or controls. Where it is determined that something is wrong with the checked parameters, the logic proceeds to step 1542 as to whether or not a message was sent. If the checked parameters are within required limits, the logic flow level proceeds to inquire whether the status period is over at step 1546.

At step 1542, the system checks if message had already been sent or not regarding parameters within or exceeding ranges and thresholds. In case the message had not been sent, the logic flow level proceeds to step 1544 where a TripsNet message is sent; otherwise, the logic flow level proceeds to step 1546 to inquire whether the status period is over.

The issued TripsNet message at step 1544 is sent in order to return the trailer to the authorized dealer, as may be appropriate where sensor controls are not within a control or modification protocol via interfaces such as the bridge integrator unit or MCU. At step 1546, the system checks if the status period is over or not by noticing a time out period. In case the status period is over, the logic proceeds to send a TripsNet status message 1548 as to that terminated status period. Otherwise, the logic returns to step 1514 to check if the CPC data is stored in database or not. This CPC data protocol is one embodiment that is demonstrated for exemplary purposes and not limitation. Similar protocols may be designed and implemented to adapt to customized management and monitoring of various systems capable of communicating with the bridge integrator unit.

Figure 10:
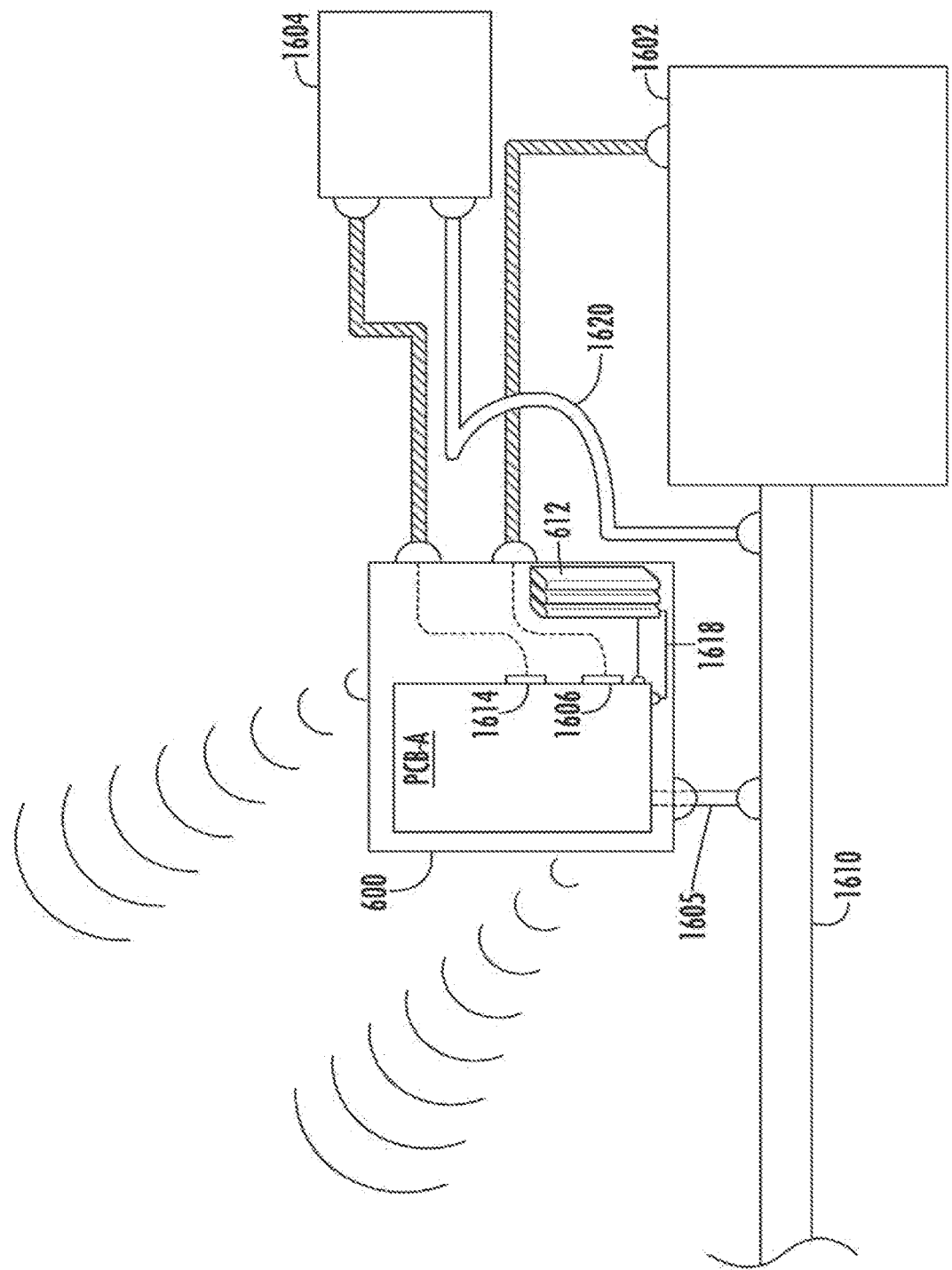

FIG. 10 illustrates bridge integrator unit 600 and its communication with various components of the telematics system, such as a device control unit 1604 and a trailer ECU 1602. The ECU is the electronic control that bridge integrator unit 600 receives a 12V power via power line 1605 from a power line carrier (PLC) 1610. Along with the PLC 1610, bridge integrator unit 600 also comprises a battery 620 for delivering power to microprocessor 1606. Bridge integrator unit 600 also includes SPI or UART interface 1614 for connecting CANBUS in order to transfer sensory data between microprocessor 1606 and device control unit 1604 via a wired interface SPI or UART.

The device control unit 1604 may receive sensory data from a plurality of sensors installed on the trailer 512. In addition, the bridge integrator unit 600 also comprises a CAN interface 1616 for communicating trailer 512 data received by a plurality of sensors to PCB-A 1606.

Further, Power Line 1620 provides a voltage of 12V to the device control unit 1604 which receives data from a plurality of sensors and transmits the received data to microprocessor 1606 of bridge integrator unit 600. Bridge integrator unit 600 further transfers the data received from a plurality of sensor devices to the master control unit (MCU) 525 via wireless radio frequency (RF) interface.

Further, FIG. 11 illustrates a detailed view of communication between various components of the network. Bridge integrator unit 600 receives data from a plurality of sensors installed on the trailer 512 via wired or wireless interfaces. Bridge integrator unit 600 may receive sensory, data through various wired communication modes such as RS232, CAN, etc. Bridge integrator unit 600 may also receive data related to the tires 1622 of the trailer 512 through various sensors installed on the tires 1622 of the trailer 512. The data received from the sensors installed on the tires 1622 may represent various tire conditions such as tire pressure, tire inflation etc.

Bridge integrator unit 600 transmits the received sensory data to the master control unit (MCU) 525 via radio frequency interface 1624, as also shown in FIG. 11. MCU 525 transfers the data received from bridge integrator unit 600 to a third party interface via wireless transmission mode or MCU 525 may store the received data on a cloud server. The wireless transmission mode in accordance with the embodiment may be but not limited to cellular transmission mode.

Thus, MCU 525 may transfer the received data to a remote location via cellular transmission, where a remote user may control the trailer 512. The remote user may read and modify the data received by MCU 525 via a telematics user interface 1620. The user interface may be alerts dashboard, which gives a complete fleet overview of any trailer failures. A map of each trailer's location is displayed. Further, a trailer dashboard gives a complete digital view of the trailer's current status including tethered/untethered, tractor voltage, lighting status, ABS status, tire conditions, temperature of the trailer, cargo status and door position. The remote user may also enter commands for the trailer 512 via the telematics user interface 1620.

In addition, the FIG. 11 also shows a nose box assembly 1618 of the trailer communication system. The nose box assembly may include a wireless transmitting device with a communication protocol such as Zigbee or Bluetooth that will transmit signals to the master control unit 525 or other remote device such as a laptop, tablet, or cell phone. The Light failure detection system 540 may also act as the nosebox assembly 1618. The nosebox assembly 1618 may receive power from tractor and may transmit the power to bridge integrator unit 600, device control unit 1604, trailer ECU 1602 via power line carrier 1610.

Further, FIG. 12 represents a typical heavy duty trailer view detailing a driver side, curb side and rear side of the trailer 512. The trailer nose box assembly 1618 may transmit the power to bridge integrator unit 600, device control unit 1604; trailer ECU 1602 via power line carrier 1610. In addition, bridge integrator unit 600 may receive data from a plurality of sensors installed on the tires 1622 of the trailer 512 via a radio frequency (RF) interface 1626. The sensory data may indicate tire's conditions such as pressure, inflation etc.

Figure 13A:
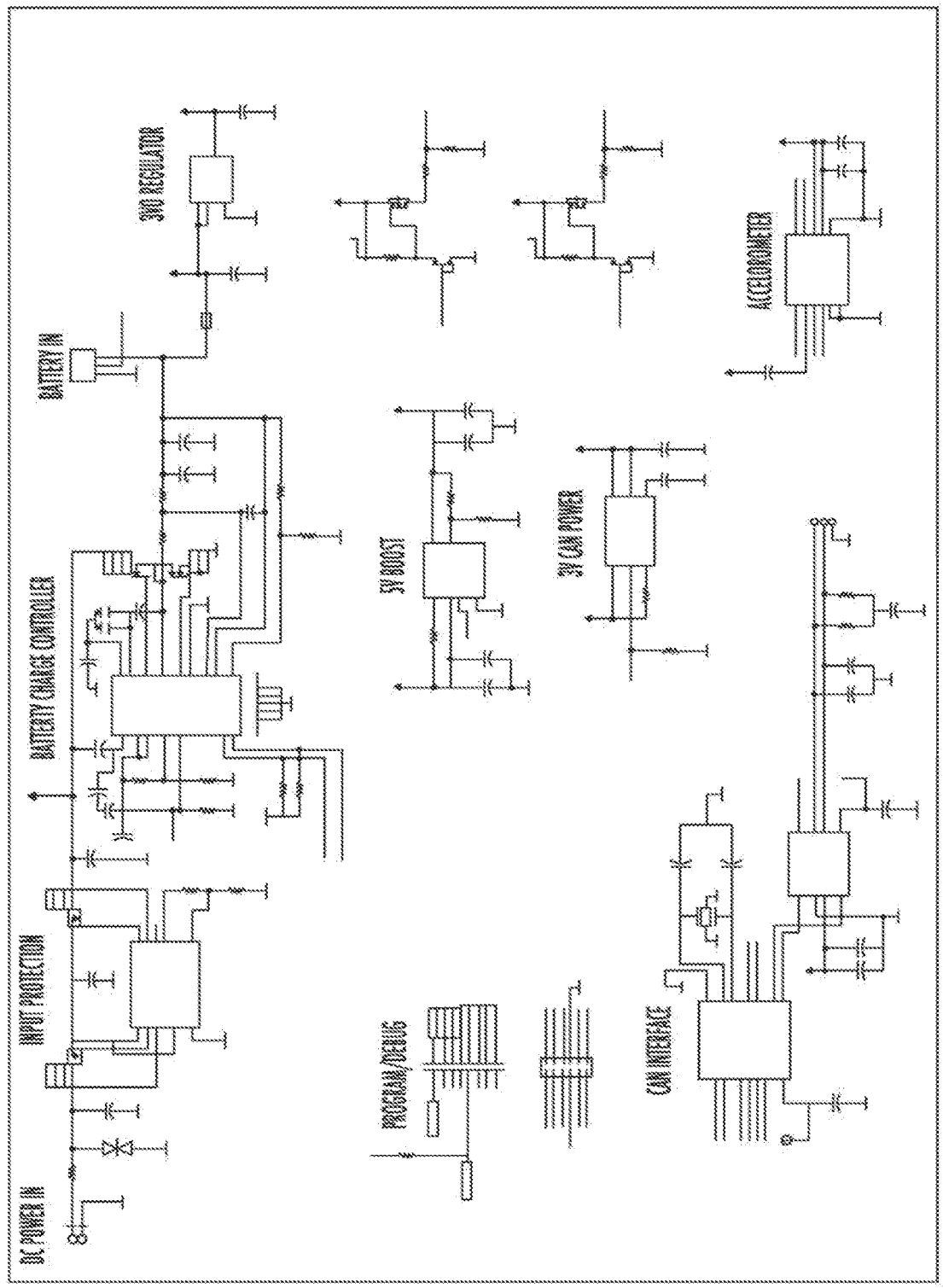
FIG. 13A is one embodiment of circuitry as utilized in a bridge integrator unit.

FIG. 13A schematically discloses various components of bridge integrator unit 600. In the embodiment shown, bridge integrator unit 600 comprises a microcontroller 814 schematically shown herein as U1, which has analog features for supporting extreme low-power devices. Further, module 820 is an AW24MCHL-H2 transceiver among wireless modules 804 which has a 2.4-GHz Direct Sequence Spread Spectrum (DSSS) complete radio module which includes a Cypress radio integrated circuit CyFi™ CYRF7936, integrated antenna, and external components. U7 and U11 shown in the FIG. 13A refer to module 820.

In addition, a module BM70BLES1FC2 818 offers Bluetooth Low Energy solution for embedded applications. It conforms to Bluetooth core specifications to enhance the throughput and security for the IoT applications. IEEE 802.15.4 is a technical standard which defines the operation of low-rate wireless personal area networks (LR-WPANs). U12 shown in the FIG. 13A schematically refers to the BITE module BM70BLES1FC2 818. Moreover, the Auxiliary connection module 808 comprises a Flash memory AT45DB081E 822 which is a 1.7 V minimum, serial-interface sequential access suitable for a wide variety of digital voice, image, program code, and data storage applications. Flash-dual footprint comprising U8 and U15 shown in FIG. 13A are referred to herein as the Flash memory modules.

U5 shown in the FIG. 13A refers to TRIPSNET Module 834 which may be a MRF24J40MD/ME which is a 2.4 GHz IEEE Std. 802.15.4TM compliant, surface mount module with integrated crystal, internal voltage regulator, matching circuitry, Power Amplifier (PA), Low Noise Amplifier (LNA) with PCB Trace Antenna (MRF24J40MD) or 50Ω external antenna connector (MRF24J40ME). U13 refers to RS232 Transceiver 812 which may be used to convert logic level signals of the UART to and from the external signaling levels, which may be standardized voltage levels, current levels, or other signals.

Figure 13B:
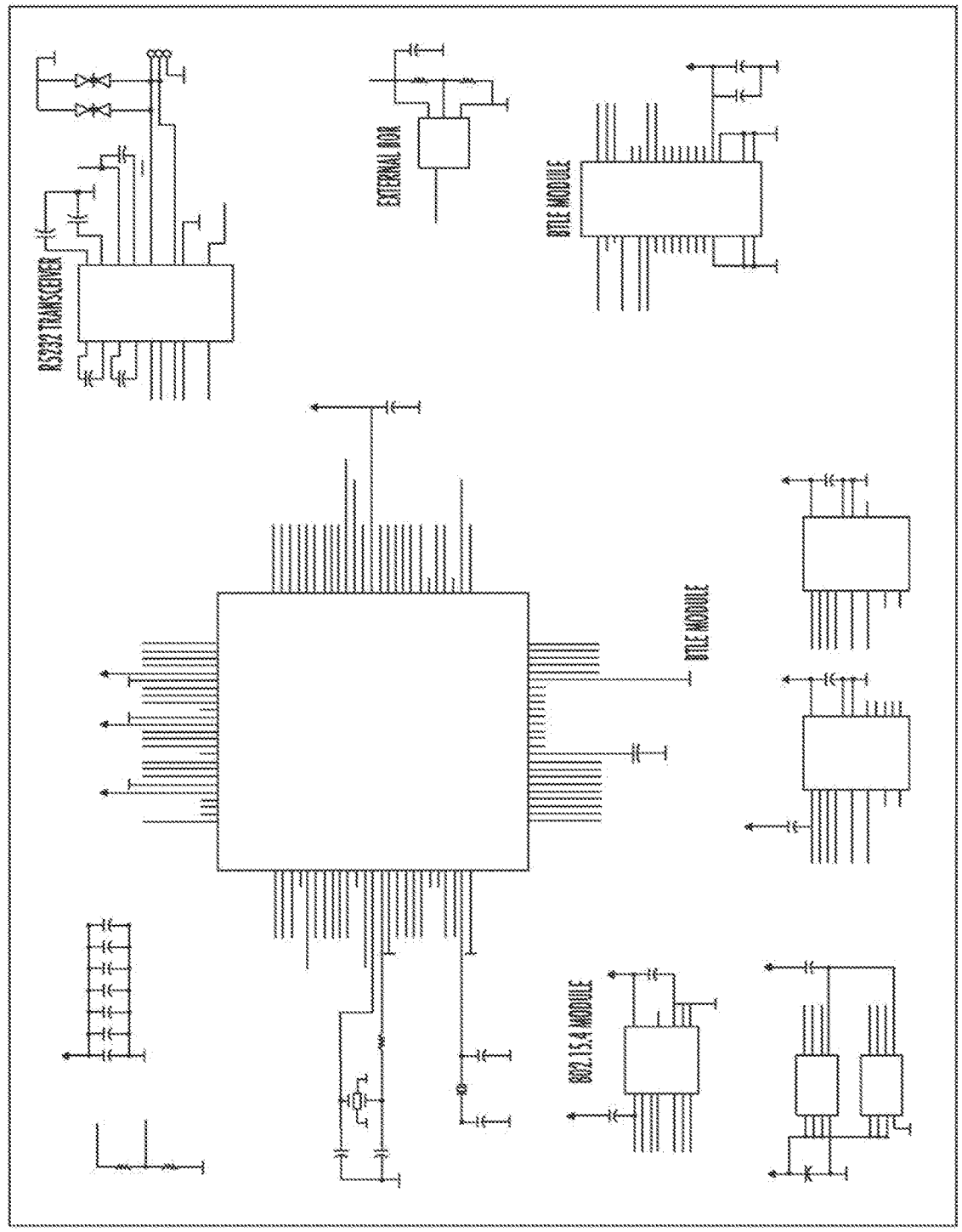
FIG. 13B illustrates another embodiment of circuitry as utilized in a bridge integrator unit.
Figure 14:
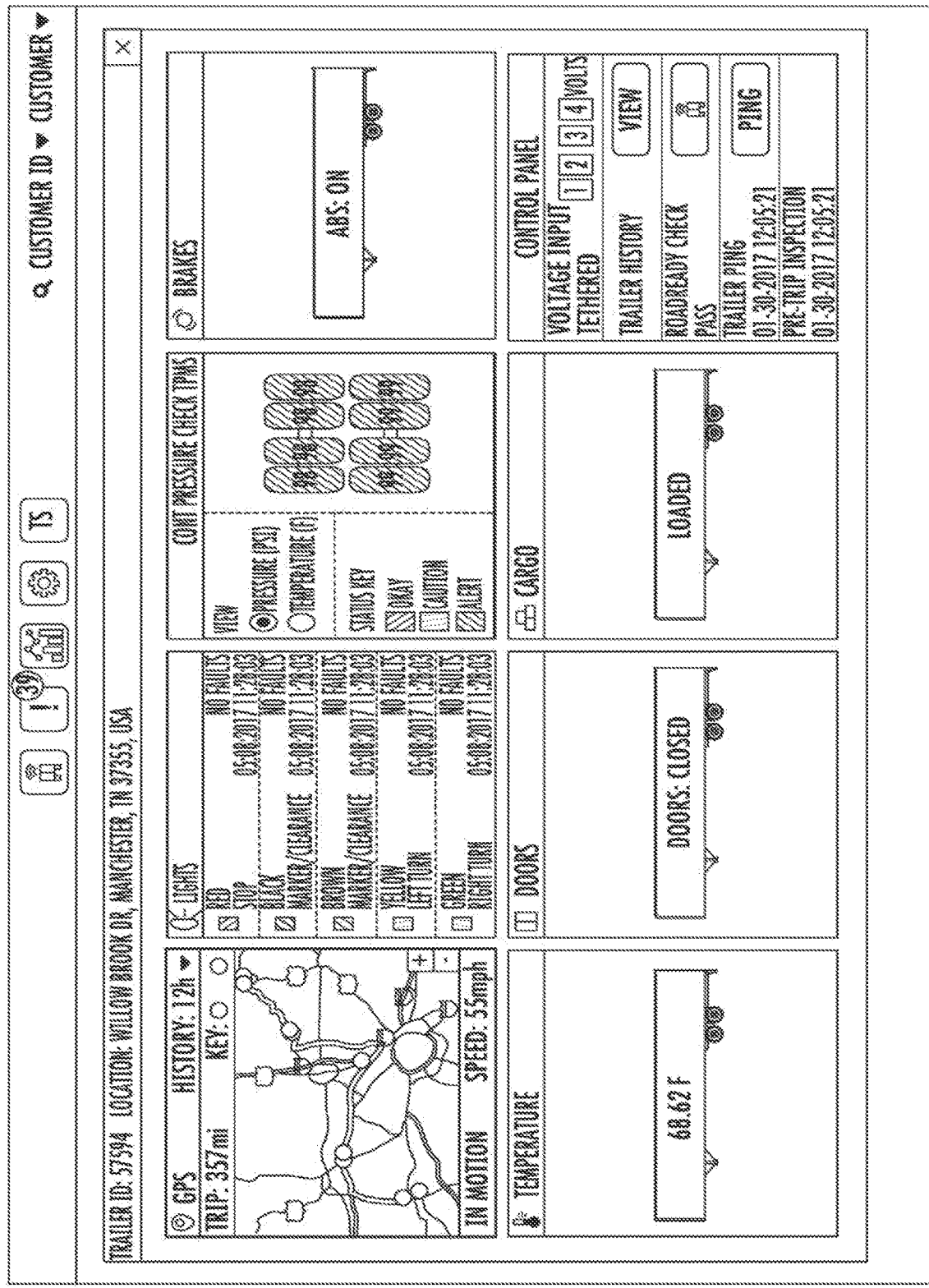
Figure 16:
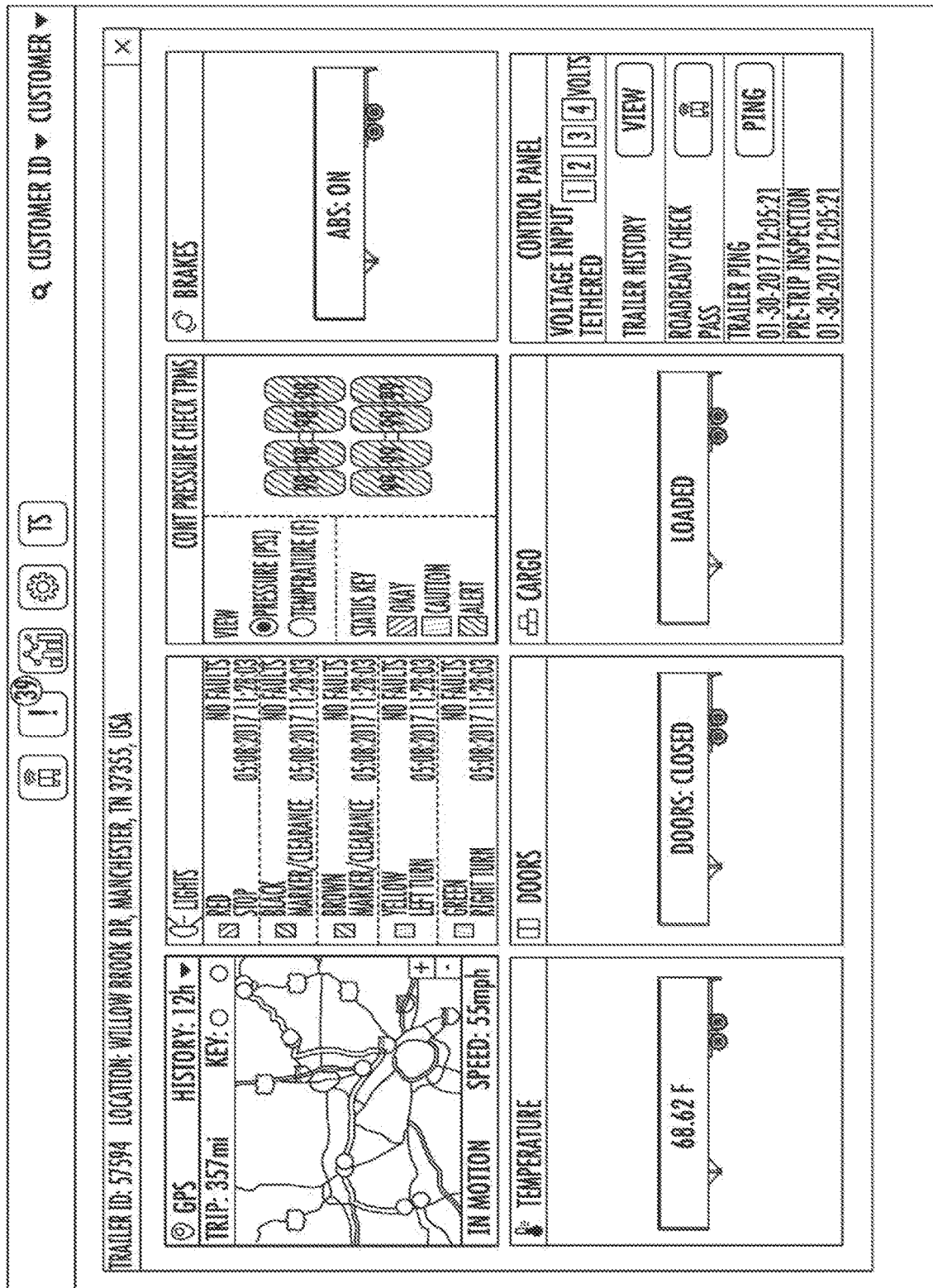

FIG. 13B schematically discloses various components of bridge integrator unit 600 in continuation to FIG. 13A, The power and battery sub-system 806, as shown in FIG. 6, comprises a dis-connectable Input voltage sense sub-system 826, a dis-connectable battery voltage sense sub-system 828, a power management sub-system 830 and a voltage regulator 832. With reference to FIG. 13B, U2 refers to the dis-connectable Input voltage sense sub-system 826, U3 refers to the power management sub-system 830 and U4 refers to a voltage regulator which may be used to output a 3V constant voltage.

Additionally, with reference to FIG. 13B, ICs 34 and 36 represent Debug port 824 which is used to simplify development and debugging operations. U14 represents CAN interface 810 used to communicate sensory data from STEMCOM sensors to the microcontroller 814. U9 refers to 5V boost regulator 832 which is a DC to DC converter providing 5 volts greater than the source voltage. U10 refers to CAN interface 810 which is used to communicate sensory data from STEMCOM sensors to the microcontroller 814. U16 with reference to FIG. 13B represents Micro-electromechanical systems (MEMS) accelerometer sensors used to measure displacement of the trailer 512 with a position-measuring interface circuit. The measured data is then converted into a digital electrical signal through an analog-to-digital converter (ADC) for digital processing.

Further, in adapting the user interface to the monitored parameters and customized systems integrated with the bridge integrator unit 600, the remote user interface may be modified overall, or widgets embedded in the user interface may be customized by customer and user preference. In addition the user may read and modify the data received by MCU 525 via a telematics user interface 1620. The user interface may be alerts at a dashboard, which gives a complete fleet overview of any trailer failures (See FIGS. 14-28). A map of each trailer's location may be displayed. A trailer dashboard gives an overall digital view of the trailer's current status including tethered/untethered, tractor voltage, lighting status, ABS status, tire conditions, temperature of the trailer, cargo status and door position, among other parameters. The remote user may also enter commands for the trailer 512 via the telematics user interface 1620.

Telematics system 500 also includes a user interface or alerts dashboard, which gives an overall fleet overview of any trailer failures. A map of each trailer's location is displayed with written details as to the condition. A trailer dashboard provides a digital view of the trailer's current status including tethered/untethered, tractor voltage, lighting status, ABS status, tire conditions, temperature of the trailer, cargo status and door position. FIGS. 14-28 illustrate examples of user interface screen shots of the telematics road ready system with a bridge integrator unit, and customized widgets dependent on the monitored parameter(s).

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A trailer monitoring system for monitoring a trailer having at least one trailer sensor, comprising:
a bridge integrator unit, configured to couple with the trailer, including a wireless data transceiver electrically coupled with a microcontroller and capable of wirelessly communicating data over a short-range wireless protocol,
wherein the bridge integrator unit receives data existing in a first messaging data format having comma delimited content, that is compatible with and used by one or more trailer sensors, via a short-range wireless protocol, extracts the data, receives data existing in a second messaging data format having comma delimited content, that is compatible with and used by one or more trailer sensors, via a short-range wireless protocol, extracts the data in the first messaging data format and the second messaging data format, encodes the data originally in the first messaging data format and the second messaging data format into a firmware language used by an internal wireless module within a master control unit having a telematic data transceiver capable of cellular data communications, and transmits the data originally included in the first messaging data format and the second messaging data format now encoded in the firmware language from the bridge integrator unit to the master control unit via a short-range wireless protocol.

2. The trailer monitoring system recited in claim 1, further comprising a controller area network (CAN) input or an RS-232 input.

3. The trailer monitoring system recited in claim 1, further comprising a global positioning system (GPS) receiver module that generates location data.

4. The trailer monitoring system recited in claim 1, further comprising the bridge integrator unit wirelessly receives data in the first messaging data format from the trailer sensors.

5. The trailer monitoring system recited in claim 1, wherein the bridge integrator unit receives power from a battery that is located on the trailer.

6. The trailer monitoring system recited in claim 1, further comprising an enclosure with a cover and a sealing interface.

7. The trailer monitoring system recited in claim 1, wherein the trailer sensors further comprise at least one of an automatic tire inflation system, a mileage sensor, a tire pressure monitoring sensor, or a temperature sensor.

8. The trailer monitoring system recited in claim 1, further comprising herein the trailer sensors further comprise a cargo load sensor or a cargo door sensor.

9. The trailer monitoring system recited in claim 1, wherein the data includes location data or sensor data.

10. The trailer monitoring system recited in claim 1, wherein the short-range wireless protocol comprises a protocol controlled by IEEE 802.15.4.

11. The trailer monitoring system recited in claim 1, wherein the short-range wireless protocol used by the bridge integrator unit to receive data from the vehicle sensor(s) is different than the short-range wireless protocol used by the bridge integrator unit to communicate data with the master control unit.

12. The trailer monitoring system recited in claim 1, further comprising the master control unit comprising a telematic data transceiver configured to communicate data to a remote user interface.

13. A trailer monitoring system for monitoring a trailer having at least one trailer sensor, comprising:
- a bridge integrator unit, configured to couple with the trailer, that includes a wireless data transceiver electrically coupled with a microcontroller and capable of wirelessly communicating data over a short-range wireless protocol; and
- a master control unit, configured to couple with the trailer, including a telematic data transceiver capable of communicating data over a cellular data network and a local wireless network master transceiver module capable of communicating data with the bridge integrator unit via a short-range wireless protocol, wherein the bridge integrator unit receives data existing in a first messaging data format having comma delimited content, that is compatible with and used by one or more trailer sensors, via a short-range wireless protocol, extracts the data, receives data existing in a second messaging data format having comma delimited content, that is compatible with and used by one or more trailer sensors, via a short-range wireless protocol, extracts the data in the first messaging data format and the second messaging data format, encodes the into a firmware language used by an internal wireless module within the master control unit, transmits the data originally included in the first messaging data format and the second messaging data format now encoded in the firmware language from the bridge integrator unit to the master control unit via a short-range wireless protocol, and the master control unit wirelessly transmits the data in the firmware language to a remote user interface via the telematic data transceiver.

14. The trailer monitoring system recited in claim 13, further comprising a controller area network (CAN) input or an RS-232 input.

15. The trailer monitoring system recited in claim 13, further comprising a global positioning system (GPS) receiver module that generates location data.

16. The trailer monitoring system recited in claim 13, wherein the bridge integrator unit receives power from a battery that is located on a trailer.

17. The trailer monitoring system recited in claim 13, wherein the trailer sensors further comprise at least one of an automatic tire inflation system, a mileage sensor, a tire pressure monitoring sensor, or a temperature sensor.

18. The trailer monitoring system recited in claim 13, further comprising herein the trailer sensors further comprise a cargo load sensor or a cargo door sensor.

19. The trailer monitoring system recited in claim 13, wherein the data includes location data or sensor data.

20. The trailer monitoring system recited in claim 1, wherein the short-range wireless protocol comprises a protocol controlled by IEEE 802.15.4.

* * * * *